(12) United States Patent
Kazami

(10) Patent No.: US 7,752,447 B2
(45) Date of Patent: Jul. 6, 2010

(54) INFORMATION-PROCESSING SYSTEM AND METHOD, INFORMATION-TRANSMISSION-PROCESSING APPARATUS, AND INFORMATION-RECEPTION-PROCESSING APPARATUS

(75) Inventor: Shinichi Kazami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 11/143,655

(22) Filed: Jun. 3, 2005

(65) Prior Publication Data

US 2005/0271206 A1    Dec. 8, 2005

(30) Foreign Application Priority Data

Jun. 8, 2004  (JP) ............................. 2004-170374

(51) Int. Cl.
*H04L 1/00* (2006.01)
*H04L 9/30* (2006.01)
*H04N 7/167* (2006.01)

(52) U.S. Cl. ....................................... 713/176; 380/201

(58) Field of Classification Search ................. 713/176; 380/201–204; 386/94–95, E5.004
See application file for complete search history.

(56) References Cited

U.S. PATENT DOCUMENTS 5,765,152 A * 6/1998 Erickson ......................... 707/9
7,363,497 B1 * 4/2008 Ferguson ..................... 713/176
2001/0034839 A1 * 10/2001 Karjoth et al. .............. 713/190
2002/0184504 A1 * 12/2002 Hughes ....................... 713/177

OTHER PUBLICATIONS

Kent, S., et al., "IP Encapsulating Security Payload (ESP)", RFC 2406, Nov. 1998.*
Dierks, T., et al., "The TLS Protocol, Version 1.0", RFC 2246, Jan. 1999.*

* cited by examiner

*Primary Examiner*—Nasser Moazzami
*Assistant Examiner*—Travis Pogmore
(74) *Attorney, Agent, or Firm*—Oblon, Spivak, McClelland, Maier & Neustadt, L.L.P.

(57) ABSTRACT

A processing apparatus for transmitting electronic information on copyrighted work, which has a predetermined amount of data, with an electronic signature being added thereto, includes division-processing device which divides the electronic information on copyrighted work into at least two parts, electronic-signature-operating device which operates to add the electronic signature for every part of the electronic information on copyrighted work divided by the division-processing device, and information-transmitting device which synthesizes the electronic information on copyrighted work to which the electronic-signature-operating device operates to add the electronic signature and electronic signature information for determining whether the electronic signature is legitimate and transmits the synthesized information.

22 Claims, 18 Drawing Sheets

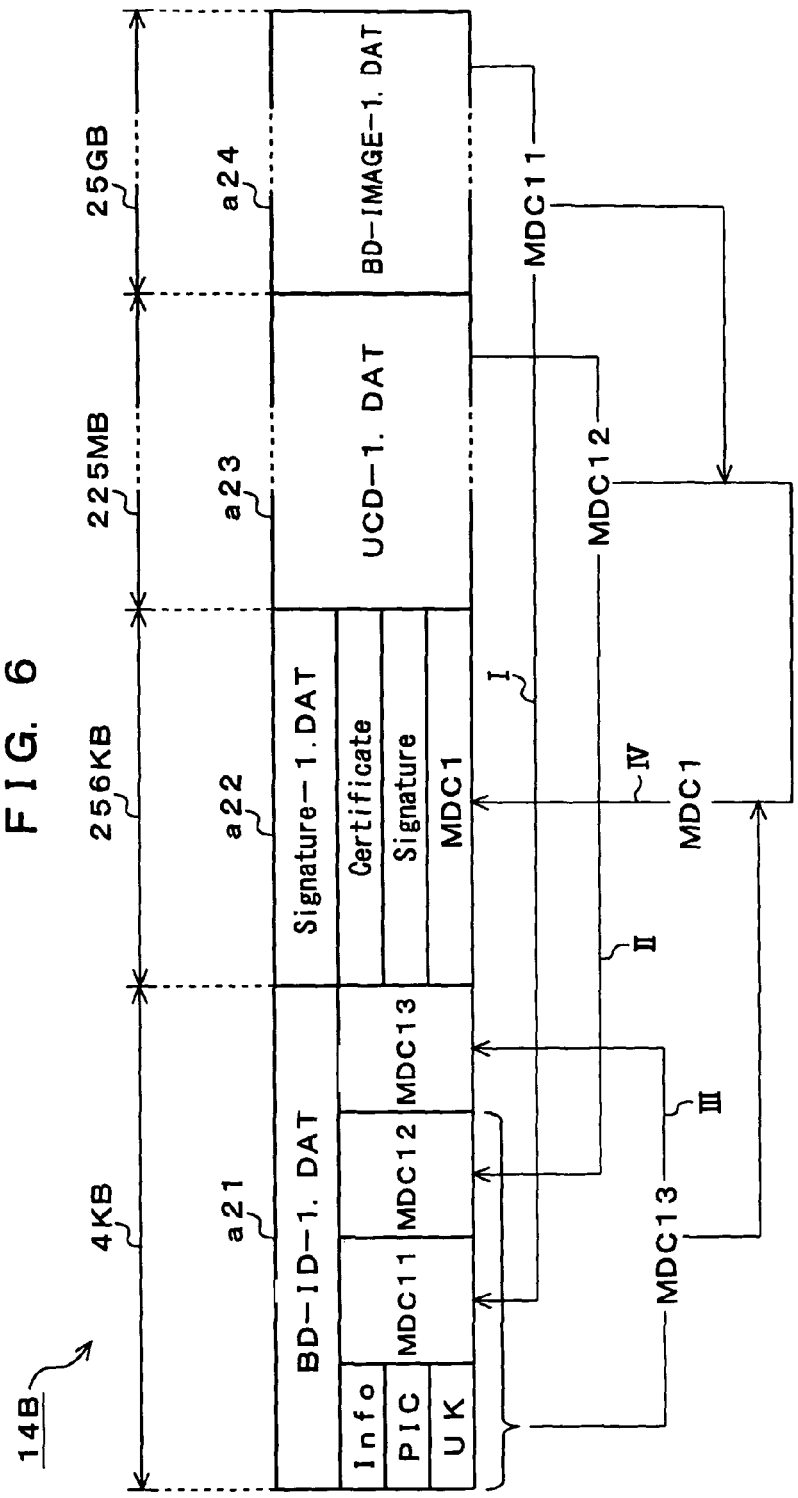

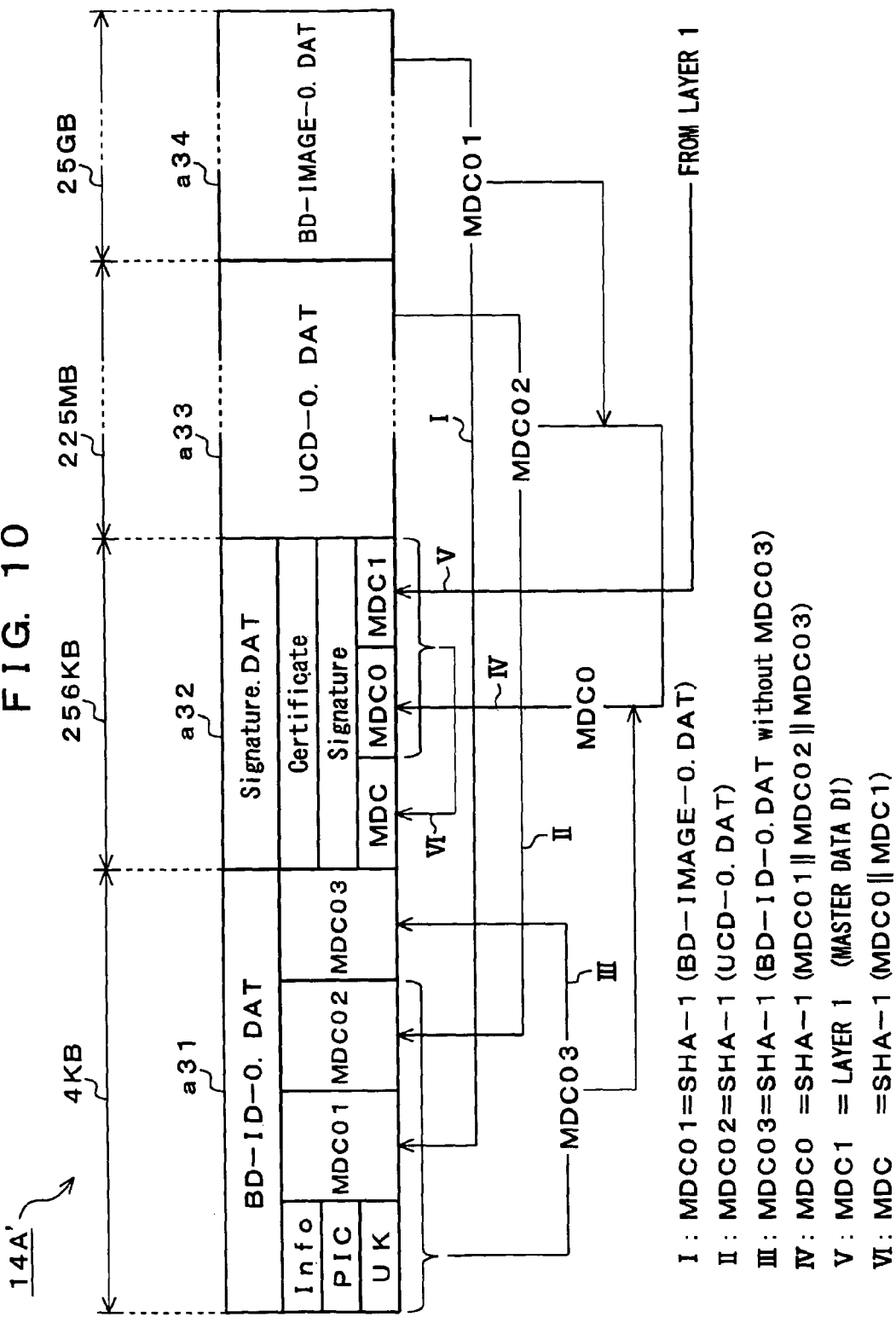

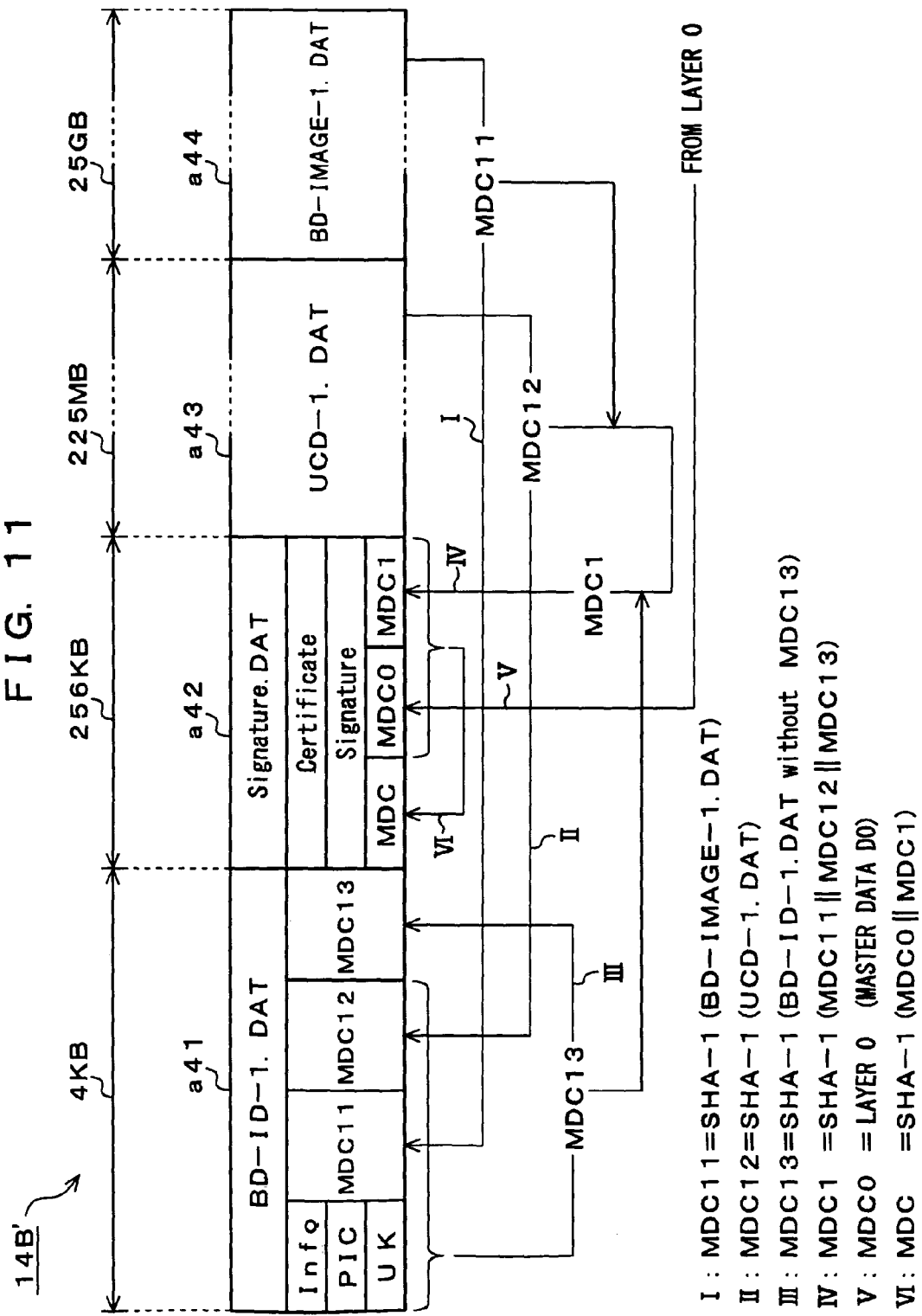

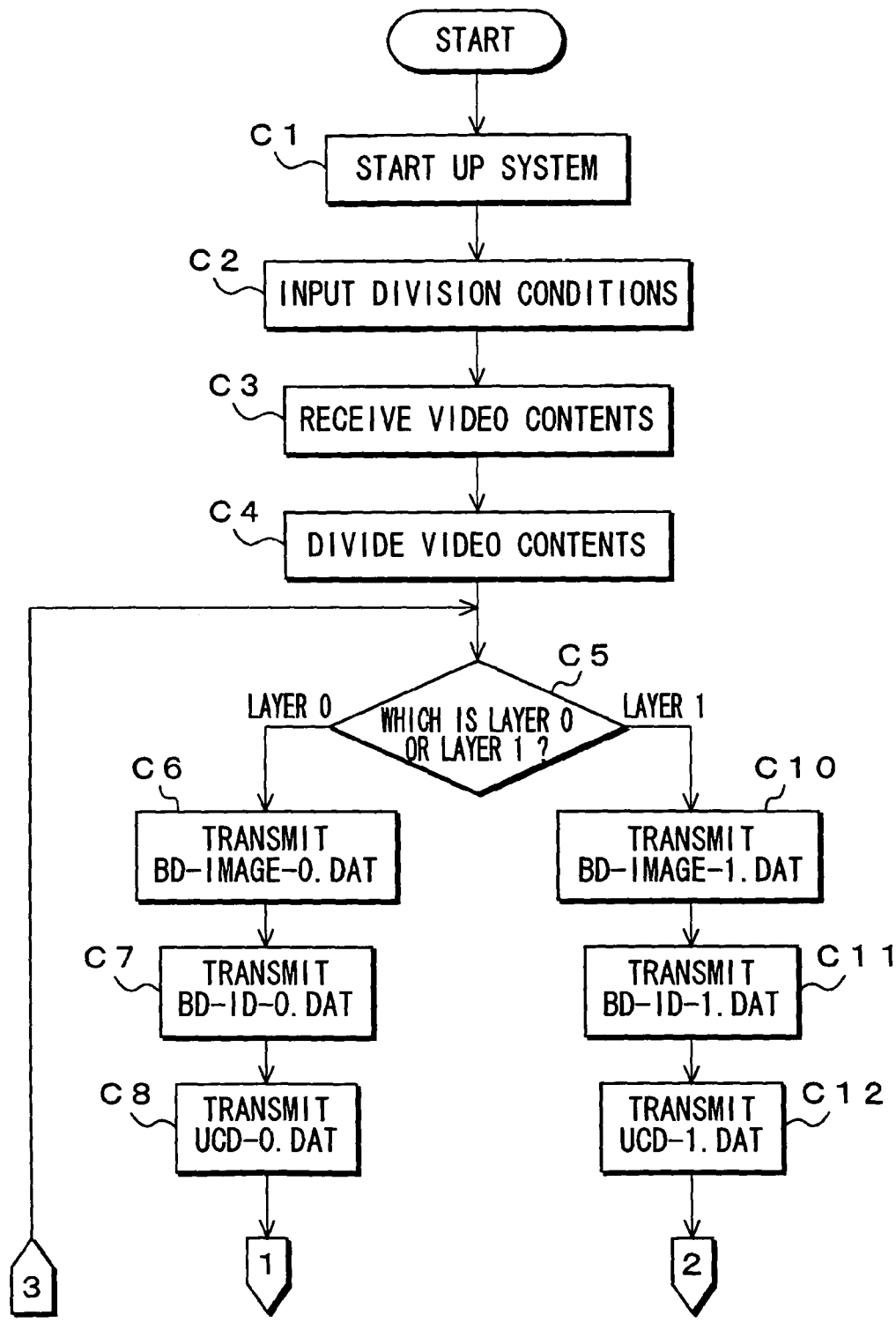

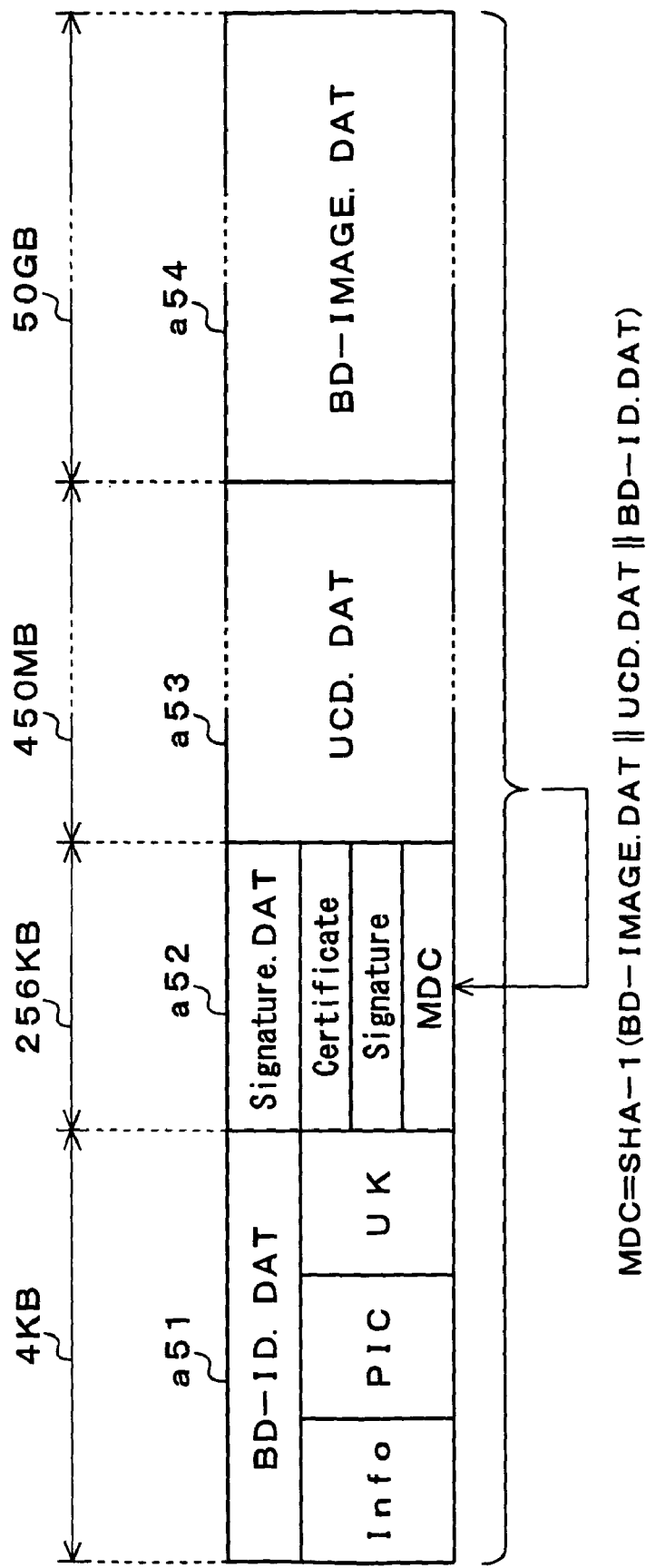

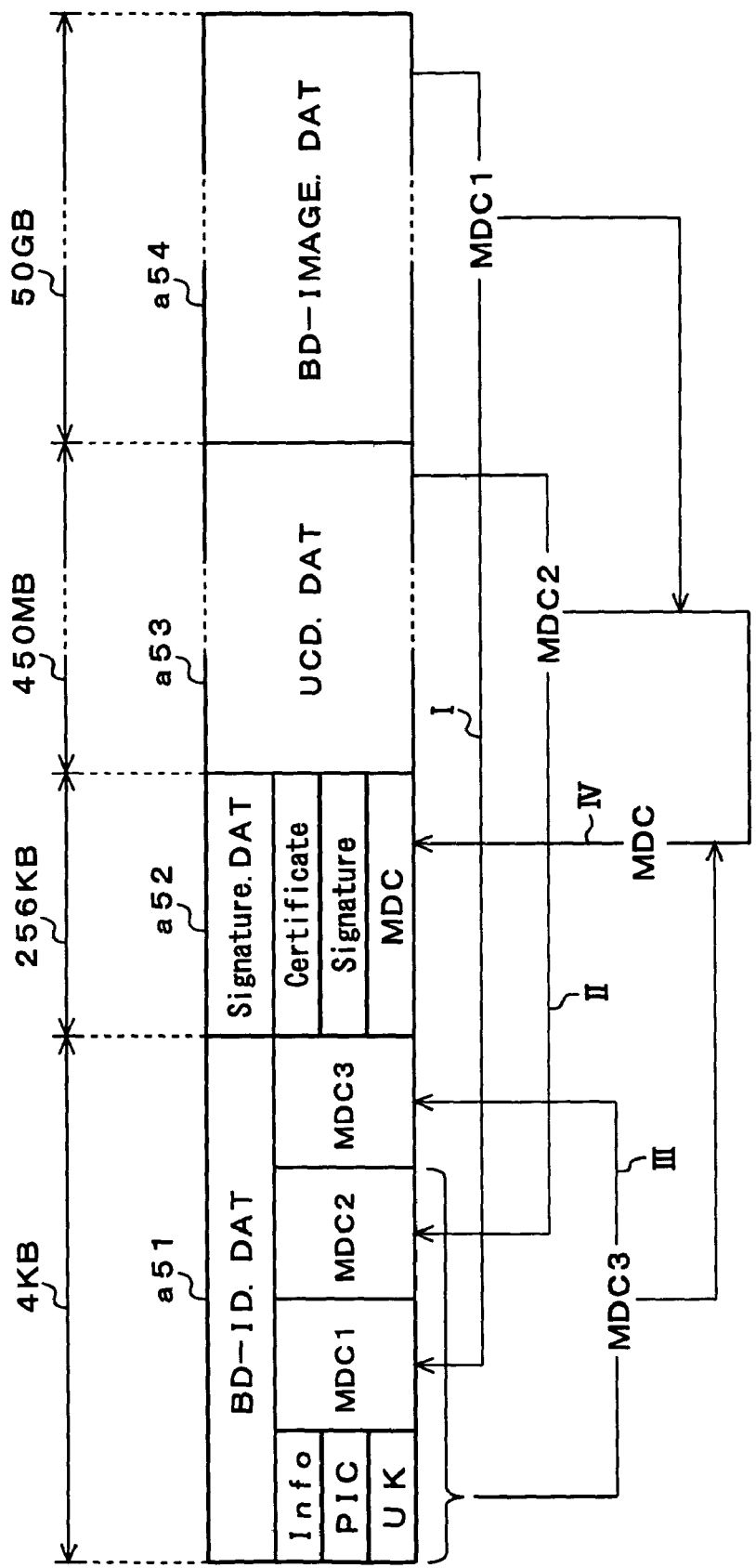

INFORMATION-PROCESSING SYSTEM AND METHOD, INFORMATION-TRANSMISSION-PROCESSING APPARATUS, AND INFORMATION-RECEPTION-PROCESSING APPARATUS

CROSS REFERENCE TO RELATED APPLICATION

The present invention contains subject matter related to Japanese Patent Application JP 2004-170374 filed in the Japanese Patent Office on Jun. 8, 2004, the entire contents of which being incorporated herein by reference.

BACKGROUND OF THE INVENTION

1. Field of the Invention

The present invention relates to information-processing system and method, an information-transmission-processing apparatus, and an information-reception-processing apparatus, which are preferably applied to a system for transmitting electronic information on copyrighted work such as a large amount of image data for a disk from a transmitting side, studio or the like to a receiving side, a disk-stamper-forming facility or the like.

2. Description of Related Art

Recently, recording medium such as a digital versatile disk (DVD) has been developed. In one piece of such the recording medium, a large amount of data having a volume of an entire motion picture may have been recorded as digital information. If making and distributing such the DVD, an information-transmitting system is employed in which film information (electronic information on copyrighted work) such as a large amount of image data for a disk is transmitted from a transmitting side, studio or the like to a receiving side, a disk-stamper-forming facility or the like.

For example, in connection with such the information-transmitting system, Japanese Patent Publication No. 2001-94554 discloses an information-transmitting system, an information-transmitting apparatus, an information-receiving apparatus, and an information-transmitting method. In this information-transmitting system, a transmitting side transmits to a receiving side contents-data with identification information for identifying the information-transmitting apparatus being added thereinto and identification information for identifying the information-transmitting apparatus that is encrypted using a distributed key peculiar to the information-receiving apparatus of the receiving side, and the receiving side decrypts the received identification information thus encrypted using the distributed key peculiar to the information-receiving apparatus so that legitimacy of this contents-data can be determined by comparing the identification information added to the contents-data and the identification information decrypted using the distributed key to detect their correspondence. Such the configuration of the system allows the contents-data to be prevented from being illegitimately utilized.

As it has been possible to record such the image information and the like on DVD as digital information, a protection of copyrighted work by preventing it from being illegitimately copied has increasingly become important. As a copy protection technology of DVD-Video or the like, contents-scrambling system (CSS) is generally adopted. This CSS accepts an application only for DVD-ROM medium and prohibits its utilization for recordable DVD medium such as DVD-R, DVD-RW, DVD+R, and DVD+RW under CSS contract. Thus, it is an illegitimate action under the CSS contract to copy the entire contents of DVD-Video, which is protected by copyright according to CSS, on the recordable DVD (as bit-by-bit copying)

After developing the CSS, proposed have been contents protection for pre-recorded media (CPPM) as a copyright protection technology for DVD-ROM such as DVD-Audio, and contents protection for recordable media (CPRM) for a copyright protection technology for a recordable DVD-ROM and a memory card. They have such characteristics that a system may be updated if they have any problem on encryption of contents or storage of management information and the reproduction of data may be limited if the entire data is copied.

It is to be noted that an article, "Enlargement of copyright protection space based on DVD" by Yamada, in pages 143 through 153 of NIKKEI Electronics published on Aug. 13, 2001 discloses a copyright protection method of DVD, and "Content Protection for Recordable Media Specification DVD Book" distributed by 4C Entity, LLC, USA who is a license manager discloses CPRM.

SUMMARY OF THE INVENTION

It is necessary to provide a system for protecting a copyrighted work from any manipulations or the like as a recent contents-management, taking into consideration the system in which contents to be stored in a disk, which has a large amount of data, are transmitted from a transmitting side, studio or the like to a receiving side, a disk-stamper-forming facility or the like.

It is preferable that the above system is created, taking reduction in verification time into consideration.

To enable such the system to be provided, it is desirable to provide information-processing system and method, an information-transmission-processing apparatus, and an information-reception-processing apparatus, which are able to carry out identification of the transmitting side and briefly and easily identify or verify that electronic information on copyrighted work is not forged or manipulated for every piece of the electronic information on copyrighted work.

According to an embodiment of the present invention, there is provided an information-transmission-processing apparatus which transmits electronic information on copyrighted work, which has a predetermined amount of data, with an electronic signature being added thereto. The apparatus has division-processing device which divides the electronic information on copyrighted work into at least two parts. The apparatus also has electronic-signature-operating device which operates to add the electronic signature for every part of the electronic information on copyrighted work divided by the division-processing device. The apparatus further has information-transmitting device which synthesizes the electronic information on copyrighted work to which the electronic-signature-operating device operates to add the electronic signature and electronic signature information for determining whether the electronic signature is legitimate and transmitting the synthesized information.

Thus, in the embodiment of the information-transmission-processing apparatus which transmits electronic information on copyrighted work, which relates to the present invention, the division-processing device divides the electronic information on copyrighted work into at least two parts when transmitting the electronic information on copyrighted work, which has a predetermined amount of data, with the electronic signature being added thereto. The electronic-signature-operating device operates to add the electronic signature for every part of the electronic information on copyrighted work divided by the division-processing device. Supposing this, the information-transmitting device synthesizes the electronic information on copyrighted work to which the electronic-signature-operating device operates to add the electronic signature and the electronic signature information for determining whether the electronic signature is legitimate and transmits the synthesized information.

It is thus possible that a receiving side carries out identification of the transmitting side in connection with the electronic information on copyrighted work received from the transmitting side and briefly and easily identifies or verifies that the electronic information on copyrighted work is not forged or manipulated for every part of the divided electronic information on copyrighted work.

According to another embodiment of the invention, there is also provided an information-reception-processing apparatus that receives and verifies electronic information on copyrighted work, which has a predetermined amount of data, with an electronic signature being added thereto. The apparatus has receiving device that receives the electronic information on copyrighted work, which has been divided into at least two parts and includes the electronic signature, and electronic signature information for determining whether the electronic information on the copyrighted work is legitimate. The apparatus also has determining device that determines whether the electronic signature is legitimate based on the electronic signature information for every part of the previously divided electronic information on the copyrighted work, in connection with the electronic information on the copyrighted work thus received by the receiving device.

By the embodiment of the processing apparatus for receiving and verifying the electronic information on copyrighted work, which relates to the present invention, when receiving and verifying the electronic information on copyrighted work, which has a predetermined amount of data, with an electronic signature being added thereto, the receiving device receives the electronic information on copyrighted work, which has been divided into at least two parts and includes the electronic signature, and the electronic signature information for determining whether the electronic information on the copyrighted work is legitimate. Supposing this, the determining device determines whether the electronic signature is legitimate based on the electronic signature information for every part of the previously divided electronic information on the copyrighted work, in connection with the electronic information on the copyrighted work thus received by the receiving device.

It is thus possible that a receiving side carries out identification of the transmitting side in connection with the electronic information on copyrighted work received from the transmitting side and briefly and easily identifies or verifies that the electronic information on copyrighted work is not forged or manipulated for every part of the divided electronic information on copyrighted work.

According to further embodiment of the invention, there is also provided an information-processing system that processes electronic information on copyrighted work, which has a predetermined amount of data. The system has information-transmission-processing apparatus which transmits the electronic information on copyrighted work by dividing the electronic information on copyrighted work into at least two parts, adding an electronic signature for every part of the divided electronic information on copyrighted work, and synthesizing the electronic information on copyrighted work including the electronic signature and electronic signature information for determining whether the electronic signature is legitimate and transmitting the synthesized information. The system also has information-reception-processing apparatus which receives the electronic information on copyrighted work from the information-transmission-processing apparatus, wherein it is determined whether the electronic signature is legitimate based on the electronic signature information for every part of the divided electronic information on copyrighted work in connection with the received electronic information on copyrighted work.

By the embodiment of the information-processing system related to the present invention, when processing the electronic information on copyrighted work, which has a predetermined amount of data, the above information-transmission-processing apparatus and information-reception-processing apparatus, both of which relate to the present invention, are used. Thus, it is possible that a receiving side carries out identification of the transmitting side in connection with the electronic information on copyrighted work received from the information-transmission-processing apparatus and briefly and easily identifies or verifies that the electronic information on copyrighted work is not forged or manipulated for every part of the divided electronic information on copyrighted work.

According to additional embodiment of the invention, there is also provided an information-processing method for processing electronic information on copyrighted work, which has a predetermined amount of data. The method has the steps of dividing the electronic information on copyrighted work into at least two parts at transmitting side, and adding an electronic signature for every part of the divided electronic information on copyrighted work. The method also has the step of synthesizing the electronic information on copyrighted work including the electronic signature and the electronic signature information for determining whether the electronic signature is legitimate and transmitting the synthesized information to a receiving side. The method further has the steps of receiving, at the receiving side, the electronic information on copyrighted work and the electronic signature information from the transmitting side, and determining whether the electronic signature is legitimate based on the electronic signature information for every part of the divided electronic information on copyrighted work in connection with the electronic information on copyrighted work that has been received from the transmitting side.

According to the embodiment of the information-processing method related to the present invention, after the transmitting side has divided the electronic information on copyrighted work into at least two parts, an electronic signature is added for every part of the divided electronic information on copyrighted work. Then, the electronic information on copyrighted work including the electronic signature and the electronic signature information for determining whether the electronic signature is legitimate are synthesized and the synthesized information is then transmitted to a receiving side. The receiving side receives the electronic information on copyrighted work and the electronic signature information, and determines whether the electronic signature is legitimate based on the electronic signature information for every part of the divided electronic information on copyrighted work.

By the embodiment of the information-processing method related to the present invention, when processing the electronic information on copyrighted work, which has a predetermined amount of data, it is possible that a receiving side carries out identification of the transmitting side in connection with the electronic information on copyrighted work received from the transmitting side and briefly and easily identifies or verifies that the electronic information on copyrighted work is not forged or manipulated for every part of the divided electronic information on copyrighted work.

According to still another embodiment of the invention, there is also provided an information-transmitting method for transmitting electronic information on copyrighted work, which has a predetermined amount of data, with an electronic signature being added thereto. The method has the steps of dividing the electronic information on copyrighted work into at least two parts, and adding the electronic signature for every part of the divided electronic information on copyrighted work. The method also has the step of synthesizing the electronic information on copyrighted work including the electronic signature and electronic signature information for determining whether the electronic signature is legitimate and transmitting the synthesized information.

By the embodiment of the information-transmitting method related to the present invention, it is possible that a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

According to still further embodiment of the invention, there is also provided an information-receiving method for receiving and verifying electronic information on copyrighted work, which has a predetermined amount of data, with an electronic signature being added thereto. The method has the step of receiving the electronic information on copyrighted work, which has been divided into at least two parts and includes the electronic signature, and electronic signature information for determining whether the electronic signature is legitimate. The method has the step of determining whether the electronic signature is legitimate based on the electronic signature information for every part of the previously divided electronic information on the copyrighted work, in connection with the received electronic information on the copyrighted work.

By the embodiment of the information-receiving method related to the present invention, when receiving and verifying the electronic information on copyrighted work, which has a predetermined amount of data, with the electronic signature being added thereto, it is possible that a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

According to still additional embodiment of the invention, there is also provided a program for performing an information-transmitting method for transmitting electronic information on copyrighted work, which has a predetermined amount of data, with an electronic signature being added thereto. The method has the steps of dividing the electronic information on copyrighted work into at least two parts, and adding the electronic signature for every part of the divided electronic information on copyrighted work. The method also has the step of synthesizing the electronic information on copyrighted work including the electronic signature and the electronic signature information for determining whether the electronic signature is legitimate and transmitting the synthesized information.

By the embodiment of the program for performing an information-transmitting method for transmitting electronic information on copyrighted work related to the present invention, it is well-reproducibly possible that a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

According to further another embodiment of the invention, there is also provided a program for performing an information-receiving method for receiving and verifying electronic information on copyrighted work, which has a predetermined amount of data, with an electronic signature being added thereto. The method has the steps of receiving the electronic information on copyrighted work, which has been divided into at least two parts and includes the electronic signature, and electronic signature information for determining whether the electronic signature is legitimate. The method has the step of determining whether the electronic signature is legitimate based on the electronic signature information for every part of the previously divided electronic information on the copyrighted work, in connection with the received electronic information on the copyrighted work.

By the embodiment of the program for performing an information-receiving method for receiving and verifying electronic information on copyrighted work related to the present invention, when receiving and verifying the electronic information on copyrighted work, which has a predetermined amount of data, with the electronic signature being added thereto, it is well-reproducibly possible that a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 6 is a diagram for illustrating a format of master data D1 recorded in a second DLT tape 14B;

FIG. 10 is a diagram for illustrating a recorded format of master data D0 in a first DLT tape 14A';

FIG. 11 is a diagram for illustrating a recorded format of master data D1 in a second DLT tape 14B';

FIGS. 12A and 12B are flowcharts each showing first and second information-processing operation examples of an embodiment of the video contents protection system 102 according to the present invention;

FIGS. 14A and 14B are diagrams each for illustrating a recorded format of non-divisional scheme of BD-image data as first and second comparison examples.

DESCRIPTION OF THE PREFERRED EMBODIMENTS

The following will describe embodiments of information-processing system and method, an information-transmission-processing apparatus and an information-receipt-processing apparatus, which relate to the present invention, with reference to drawings.

Figure 1:
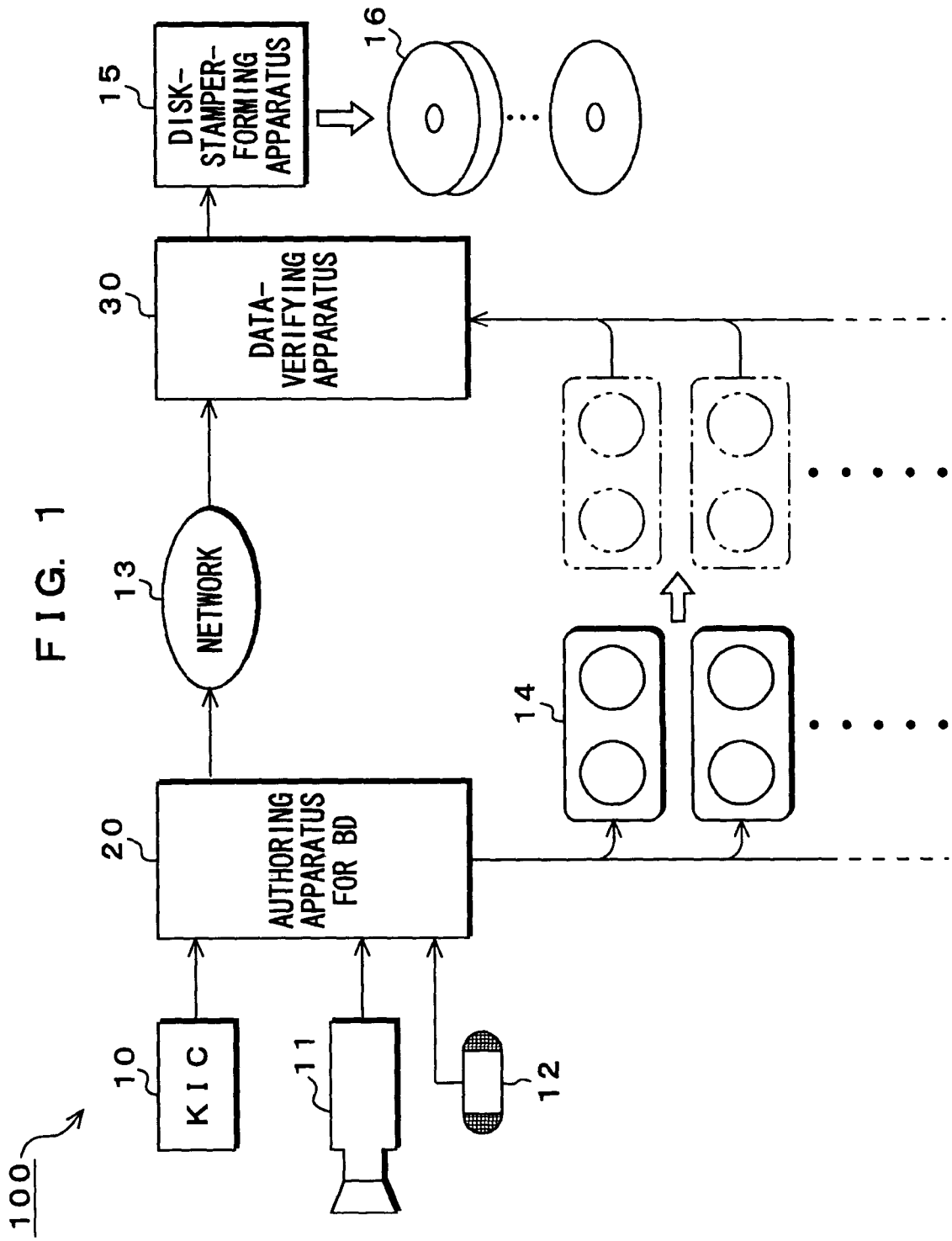
FIG. 1 is a conceptual diagram for illustrating a configuration of an embodiment of an information-processing system, namely, a copyrighted work protection system 100 according to the present invention.

FIG. 1 is a conceptual diagram for illustrating a configuration of an embodiment of an information-processing system, namely, a copyrighted work protection system 100, according to the present invention.

The copyrighted work protection system 100 is used for protecting a large amount of image data for a disk, which is an example of electronic information on copyrighted work, the information having a predetermined amount of data, from any manipulation or the like in a distribution process. Such the system 100 is preferably applied to a system in which a transmitting side, a studio or the like transmits a large amount of image data for a disk to a receiving side, a stamper-manufacturing facility or the like.

For example, in the studio for a broadcast program or a film, a camera 11 is used to shoot an object, thereby obtaining video data Vin at filming time. A microphone 12 is used to record audio information such as voice and music, thereby obtaining audio data Ain at the filming time. The video data Vin and the audio data Ain constitute video contents having a large amount of image data for a disk.

The copyrighted work protection system 100 has an editing apparatus 20 for copyrighted work information (hereinafter referred to as "authoring apparatus") for Blu-ray Disk (trademark, hereinafter referred to as "BD") and a verification apparatus 30 for copyrighted work (hereinafter referred to as "data-verifying apparatus"). The authoring apparatus 20 is an embodiment of an information-transmission-processing apparatus according to the invention and is installed within the studio in which the copyrighted work can be created. The authoring apparatus 20 divides the image data for a disk into at least two parts, adds an electronic signature for every part of the divided image data, synthesizes the image data including the electronic signature and public-key information (hereinafter referred to as "public-key data") for determining whether the electronic signature is legitimate, and transmits the synthesized data. The public-key data may be distributed from, for example, a key insure center 10 (hereinafter referred to as "KIC"), which is a copyright protection management center.

Disk-making information, security information and the like are added to such the image data for a disk to form master data. Recently, the master data for BD-ROM or the like has a large amount of data of about 50 GB.

For example, the authoring apparatus 20 divides the image data for a disk, which is created in the studio or the like and has a large amount of data, into two parts in order to secure transmission of the image data to a disk-stamper-forming facility. It generates message digest (MD) using hash function for every part of the divided image data (BD-IMAGE.DAT file) and uses a value of MD for digital signature. This value of MD is used as means for checking the manipulation of the master data or the like during a distribution process.

In this embodiment, items of master data to which the value of MD is added are respectively and separately transmitted to the stamper-forming facility. In this case, one digital signature is added to the entire master data and the values of MD are then added to each of the items of divided master data. This decreases digital signature in number to only one therefor if the master data is divided.

The data-verifying apparatus 30 is an embodiment of an information-reception-processing apparatus according to the invention and is installed within the stamper-forming facility in which the authentic copyrighted work can be copied. The data-verifying apparatus receives the master data from the authoring apparatus 20 or the studio or the like and determines whether the electronic signature is legitimate based on the public-key data or the like for every part of the divided master data in connection with the received master data. Based on a result of the determination, it is possible that the data-verifying apparatus 30 carries out identification of the transmitting side in connection with the master data received from the authoring apparatus 20 and easily identifies or verifies that the master data is not forged or manipulated for every part of the divided master data at the same time.

On how to receive the master data in the data-verifying apparatus 30, a method for receiving it from the authoring apparatus 20 through a network 13 or a method for receiving it from the studio with it being divided into at least two parts and stored in at least two tape media is utilized. The data-verifying apparatus 30 is connected to the disk-stamper-forming apparatus 15 wherein DVD disk stamper, which is not shown, can be formed on the basis of the master data when the master data is authenticated. The disk-stamper-forming apparatus 15 then manufactures plural DVD 16 or the like using the stamper.

Figure 2:
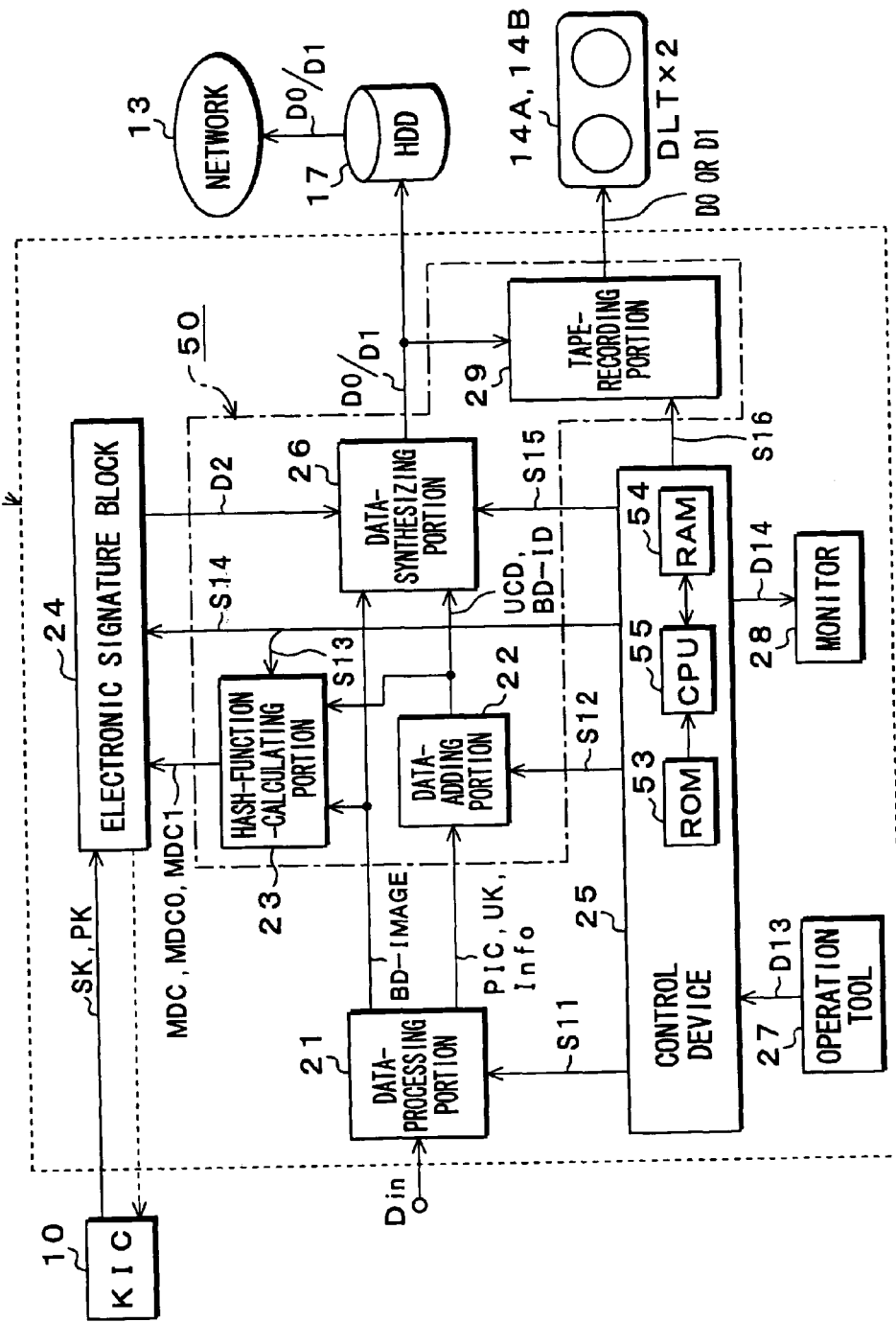
FIG. 2 is a block diagram for illustrating an internal configuration of an embodiment of an information-transmission-processing apparatus, namely, authoring apparatus 20 according to the invention and a configuration of the peripheral equipment thereof.

FIG. 2 is a block diagram for illustrating an internal configuration of authoring apparatus 20 and a configuration of the peripheral equipment thereof. The authoring apparatus 20 shown in FIG. 2 divides video contents Din, which have a large amount of data, adds security information, disk-making information and the like thereto, and transmits these items, D0, D1 of two-divided master data. The authoring apparatus 20 has a data-processing portion 21, a data-adding portion 22, a hash-function-calculating portion 23, an electronic signature block 24, a control device 25, a data-synthesizing portion 26, an operation tool 27, a monitor 28, and a tape-recording portion 29.

The control device 25 composes a launcher for authoring application/project (APP) and controls the data-processing portion 21, the data-adding portion 22, the hash-function-calculating portion 23, the electronic signature block 24, the data-synthesizing portion 26, the tape-recording portion 29 and the like as one higher class member to provide respective portions and block with necessary information, thereby managing the entire apparatus. The control device 25 also has central processing unit (CPU) 55 for controlling operations of the entire apparatus. The CPU 55 is connected to a read only memory (ROM) 53 and a random access memory (RAM) 54.

The ROM 53 previously stores a program for allowing the CPU 55 to carry out generation of two items of master data D0, D1 based on BD-image data, disk-making information, and electronic signature data D2. This program is used for transmitting electronic information on copyrighted work, which has a predetermined amount of data, with an electronic signature being added thereto wherein the electronic information on copyrighted work is divided into at least two parts, an electronic signature is added for every part of the divided electronic information on copyrighted work, and the electronic information on copyrighted work including the electronic signature and the electronic signature information for determining whether the electronic signature is legitimate are synthesized and transmitted.

According to this program (first program), it is possible that a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

The ROM 53 also stores system program data for controlling the entire apparatus in addition with the above program. The RAM 54 is used as a work memory to temporarily store control commands to be used when synthesizing data, disk-making information, and the like.

At power-on, the CPU 55 reads the system program data out of the ROM 53 to the RAM 54 to start the system and control the entire apparatus. For example, the CPU 55 carries out control programs to control input/output of each of the data-processing portion 21, the data-adding portion 22, the hash-function-calculating portion 23, the electronic signature block 24, the data-synthesizing portion 26, the monitor 28, and the tape-recording portion 29 on the basis of operational data D13 obtained from operation tool 27.

The control device 25 transmits data-processing signal S11 to the data-processing portion 21, data-adding signal S12 to the data-adding portion 22, calculation control signal S13 to the hash-function-calculating portion 23, electronic signature control signal S14 to the electronic signature block 24, data synthesis control signal S15 to the data-synthesizing portion 26, and data-recording control signal S16 to the tape-recording portion 29, respectively, and controls them.

The operation tool 27 is an embodiment of electronic-signature-operating means. It operates to input conditions when video contents Din should be divided into two layers, Layer 0 and Layer 1, and to add an electronic signature for every part of the BD-image data divided by the data-processing portion 21. The operational data D13 obtained by operating the operation tool 27 is transmitted to the control device 25. The monitor 28 displays divisional conditions into the Layer 0 and Layer 1, the disk-making information, and the like based on display data D14. The image data is divided relative to discontinuous portions in image, selector unit (64 or 2 K Byte) of BD-ROM in the disk-stamper-forming apparatus 15 or the like.

The control device 25 is connected with the data-processing portion 21, which is an embodiment of division-processing means, for receiving the video contents Din and dividing the video contents Din into at least two parts based on the data-processing signal S11 transmitted from the control device 25. The data-processing portion 21 transmits two items of the divided BD-image data (BD-IMAGE-0.DAT and BD-IMAGE-1.DAT) to BD-ROM according to a standard of user defined function (UDF) 2.5. The data-processing signal S11 includes unit-key information (Unit-Key. info), and copy protection system (CPS) information. The above information is described using a markup language such as extensible markup language (XML).

The data-processing portion 21 converts a data stream structure (elementary stream (ES)) of the video contents Din to a data stream structure (transport stream) of BD-ROM before or after the division and creates file system finally. In such the embodiment, if the video contents have an amount of data of 50 G Bytes (hereinafter referred to as "GB") and are divided into two layers, Layer 0 and Layer 1, BD-IMAGE-0.DAT file of Layer 0 has an amount of data of 25 GB and BD-IMAGE-1.DAT file of Layer 1 has an amount of data of 25 GB.

BD-image data of Layer 0 constitutes BD-IMAGE-0.DAT file that is transmitted to the data-synthesizing portion 26. BD-image data of Layer 1 constitutes BD-IMAGE-1.DAT file that is also transmitted to the data-synthesizing portion 26. The data-processing portion 21 further transmits address data (File addr-map), disk divisional information, and the like, which are necessary for manufacturing DVD in the disk-stamper-forming facility, to the data-adding portion 22. The disk divisional information includes PIC (Permanent Information and Control Data) information, unit-key (UK) information, and information on an owner (author) of copyright (info). The PIC information indicates the physical parameter of the disc, such as how many layer the disc has (one layer or two layer) and the how many capacity the disc has (20 GB/layer or 23 GB/layer).

In this embodiment, the data-adding portion 22, the hash-function-calculating portion 23, the data-synthesizing portion 26, and the tape-recording portion 29 constitute a downloader 50. The downloader 50 generates sub-information for disk-making based on various kinds of the information obtained from the data-processing portion 21 and the control device 25 and message digest code (hereinafter referred to as "MDC"). When the studio transmits items of the master data D0, D1 to the disk-stamper-forming facility, the MDC is necessary as identification data of digital signature for preventing the manipulation of the master data.

The data-processing portion 21 is connected with the data-adding portion 22. The data-adding portion 22 transmits a user control file (hereinafter referred to as "UCD.DAT") and a blue-ray disk identification file (hereinafter referred to as "BD-ID.DAT") to the hash-function-calculating portion 23 and the data-synthesizing portion 26 based on the data-adding signal S12 transmitted from the control device 25. The data-adding signal S12 includes copy protection information for preventing the copy (CPS-Unit information) and PIC information. The above information is described using a markup language such as extensible markup language (XML).

Contents of CPS-Unit information is illustrated as follows:
/BDMV/STREAMS/01001.m2ts:CPS Unit#1
/BDMV/STREAMS/01002.m2ts:CPS Unit#1
/BDMV/STREAMS/01003.m2ts:CPS Unit#1
/BDMV/STREAMS/01004.m2ts:CPS Unit#2 where CPS Unit#1 and CPS Unit#2 indicate that two encryption processing procedures should be performed. Therefore, as decoding it, two species of key information are necessary therefor. In this embodiment, the electronic signature data D2 is decrypted using a secret-key SK and a public-key PK.

The above UCD.DAT file has an amount of data of 225 MB and the BD-ID.DAT file has an amount of data of 4 KB. Into the BD-ID.DAT file, information on owner (author) of copyright (info), PIC-DAT (DI) data having an amount of data of 2 KB, and UK-Addr data having an amount of data of 16 B are written.

The hash-function-calculating portion 23 is connected with the data-processing portion 21 and the data-adding portion 22. The hash-function-calculating portion 23 calculates hash function of the BD-IMAGE-0.DAT transmitted from the data-processing portion 21 based on the calculation control signal S13 transmitted from the control device 25 to transmit message digest code, MDC01. Hereinafter, if the hash function is illustrated as "SHA-1", the above hash function calculation processing is illustrated as "MDC01=SHA-1(BD-IMAGE-0.DAT)".

Similarly, if it calculates the hash function based on BD-IMAGE-1.DAT to transmit MDC11, the processing is illustrated as "MDC11=SHA-1(BD-IMAGE-1.DAT)". The hash-function-calculating portion 23 transmits MDC01 through MDC03, MDC0, MDC11 through MDC13, MDC1 and MDC. The hash-function-calculating portion 23 generates a hash value having a data length of 160 bits when received data has a data length of 512 bits.

The electronic signature block 24 is connected with the hash-function-calculating portion 23. The electronic signature block 24 adds a digital electronic signature based on the electronic signature control signal S14 transmitted from the control device 25, a secret key of owner of contents (copyright) and a public-key, keys of which are obtained from KIC 10, to transmit the electronic signature data D2 (=Signature). For example, the electronic signature block 24 securely keeps the secret key SK of owner of copyright, generates a digital electronic signature from MDC, MDC0, and MDC1 received from the hash-function-calculating portion 23, and sends the electronic signature data D2 back to the data-synthesizing portion 26. The public-key PK is used for determining whether the BD-image data or the like is legitimate.

The electronic signature data D2 constitutes Signature-.DAT file of 256 KB and is added for verifying that contents of electronic information such as BD-IMAGE.DAT file, UDC.DAT file, BD-ID.DAT file or the like are legitimate. To the Signature.DAT file, the message digest codes, MDC, MDC0, and/or MDC1, "Signature" indicating the electronic signature, and "Certificate" for certifying an owner of copyright (contents) are written. The electronic signature block 24 encrypts MDC0 of Layer 0 and MDC1 of Layer 1, for example, based on the secret key SK to transmit the encrypted electronic signature data D2 to the data-synthesizing portion 26.

The data-synthesizing portion 26 is connected with the data-processing portion 21, the data-adding portion 22, and the electronic signature block 24. The data-synthesizing portion 26 synthesizes the above-mentioned four files based on the data synthesis control signal S15 transmitted from the control device 25 to generate two items of master data, D0, D1. For example, the data-synthesizing portion 26 synthesizes: BD-ID-0.DAT file, Signature-0.DAT file, UCD-0.DAT file, and BD-IMAGE-0.DAT file to transmit first master data D0.

The data-synthesizing portion 26 also synthesizes BD-ID-1.DAT file, Signature-1.DAT file, UCD-1.DAT file, and BD-IMAGE-1.DAT file to transmit second master data D1. Thus, respective items of master data D0, D1 each composed of four files are transmitted or carried to a disk-stamper-forming facility through a network 13 or using two DLT tapes 14A, 14B.

The tape-recording portion 29, which is an embodiment of information-transmitting means, is connected with the data-synthesizing portion 26. The tape-recording portion 29 records the master data D0, D1 to which the electronic signature is added by operation of the operation tool 27 and Signature-DAT file (public-key data and the like) for determining whether the electronic signature is legitimate is also added on each of the two DLT tapes, 14A and 14B for each of the Layer 0 and Layer 1 based on the data-recording control signal S16 transmitted from the control device 25. The master D0 to which Signature-0.DAT file is added is recorded on the DLT tape 14A and the master D1 to which Signature-1.DAT file is added is recorded on the DLT tape 14B. Thus, in connection with the master data D0, D1, MDC is added to each of the items of master data D0, D1 and these plural MDCs become subject to writing of a signature to the BD-ROM.

It is to be noted that if items of the master data D0, D1 are transferred to the disk-stamper-forming facility via a network, they are stored in a hard disk (HDD) 17. They then are transmitted from HDD 17 to an HDD, not shown, in the disk-stamper-forming facility through any desired communication processing.

Figure 3:
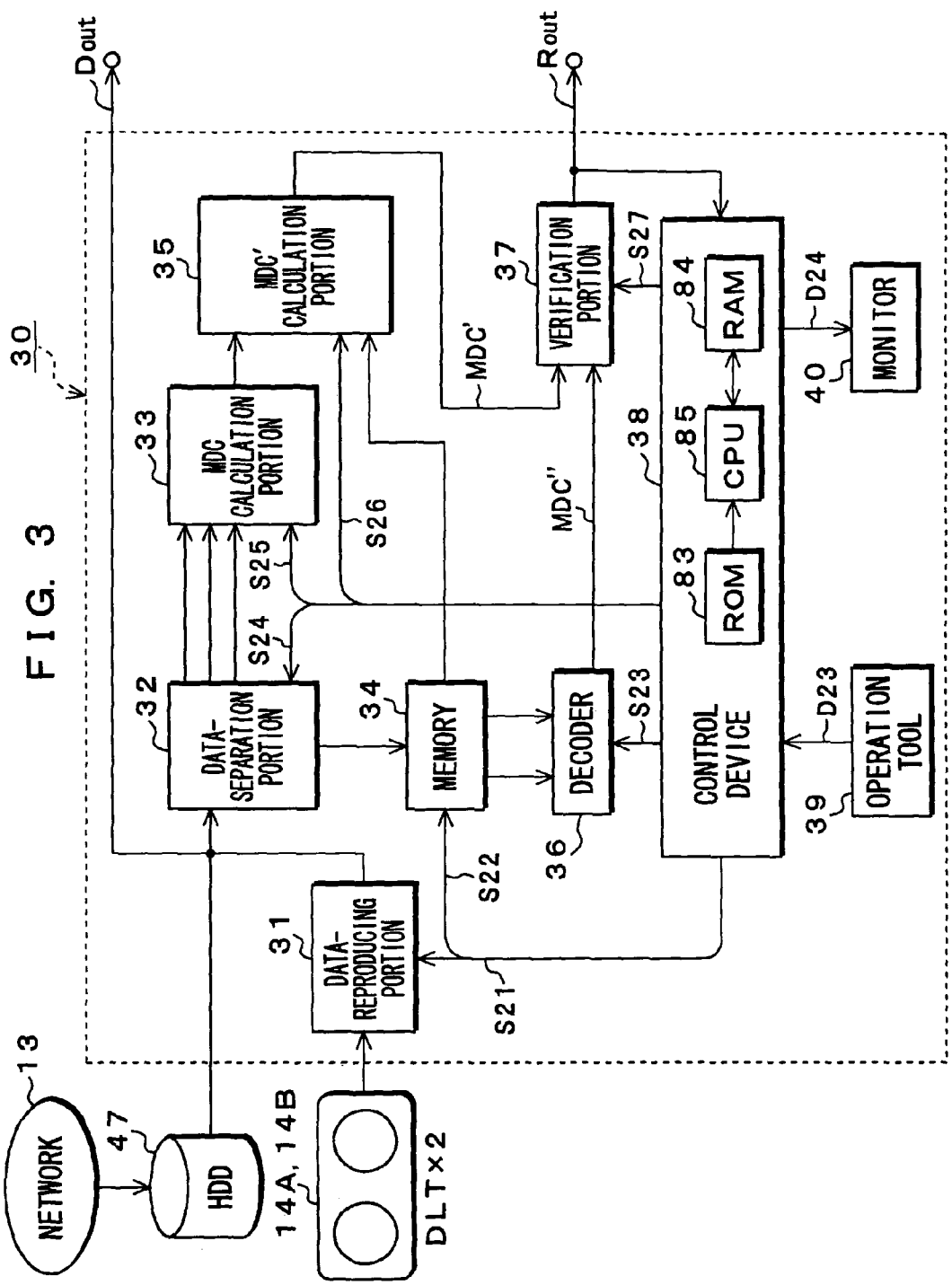
FIG. 3 is a block diagram for illustrating an internal configuration of an information-reception-processing apparatus, namely, data-verifying apparatus 30 according to the invention and a configuration of the peripheral equipment thereof.

FIG. 3 is a block diagram for illustrating an internal configuration of data-verifying apparatus 30 and a configuration of the peripheral equipment thereof. The data-verifying apparatus 30 shown in FIG. 3 is installed within a disk-stamper-forming facility and used for receiving items of the master data D0, D1, which have a predetermined amount of data. In the disk-stamper-forming facility, as receiving items of the master data D0, D1, MDC'' decrypted from the electronic signature data D2 and real data MDC' are compared with each other to determine whether the electronic signature is legitimate. The data-verifying apparatus 30 has a data-reproducing portion 31, a data separation portion 32, an MDC calculation portion 33, a memory 34, an MDC' calculation portion 35, a decoder 36, a verification portion 37, a control device 38, an operation tool 39, and a monitor 40.

The control device 38 controls the data-reproducing portion 31, the data separation portion 32, the MDC calculation portion 33, the memory 34, the MDC' calculation portion 35, the decoder 36, the verification portion 37 and the like as one higher class member to provide respective portions and block with necessary information, thereby managing the entire apparatus. The control device 38 also has central processing unit (CPU) 85 for controlling operations of the entire data-verifying apparatus. The CPU 85 is connected to an ROM 83 and an RAM 84.

The ROM 83 previously stores a program for allowing the CPU 55 to carry out verification processing of two items of master data D0, D1. This program is used for receiving and verifying electronic information on copyrighted work, which has a predetermined amount of data, with an electronic signature being added thereto wherein the electronic information on copyrighted work, which has been divided into at least two parts and includes electronic signature, and the electronic signature information for determining whether the electronic information on the copyrighted work is legitimate are received, and in connection with the received electronic information on copyrighted work, it determines whether the electronic signature is legitimate based on the electronic signature information for every part of the previously divided electronic information on the copyrighted work.

According to this program (second program), it is possible that when receiving and verifying electronic information on copyrighted work, which has a predetermined amount of data, with an electronic signature being added thereto, a receiving side carries out identification of the transmitting side in connection with the received electronic information on copyrighted work and briefly and easily identifies or verifies that the electronic information on copyrighted work is not forged or manipulated for every part of the divided electronic information on copyrighted work.

The ROM 83 also stores system program data for controlling the entire data-verifying apparatus in addition with the above program. The RAM 84 is used as a work memory to temporarily store control commands to be used when verifying data, information Rout on a verification result, and the like.

At power-on, the CPU 85 reads the system program data out of the ROM 83 to the RAM 84 to start the system and control the entire data-verifying apparatus. For example, the CPU 85 carries out control programs to control input/output of each of the data-reproducing portion 31, the data separation portion 32, the MDC calculation portion 33, the memory 34, the MDC' calculation portion 35, the decoder 36, the verification portion 37 and the monitor 40 on the basis of operational data D23 obtained from operation tool 39.

The control device 38 transmits data-reproducing signal S21 to the data-reproducing portion 31, data-writing/reading signal S22 to the memory 34, decode control signal S23 to the decoder 36, data separation control signal S24 to the data separation portion 32, calculation control signal S25 to the MDC calculation portion 33, calculation control signal S26 to the MDC' calculation portion 35, and verification control signal S27 to the verification portion 37, respectively, and controls them.

The operation tool 39 is operated when instructing CPU 85 to carry out verification of the master data D0 or D1. The operational data D23 obtained by operating the operation tool 39 is transmitted to the control device 38. The monitor 40 displays the information Rout on a verification result, and the like based on display data D24.

The data-reproducing portion 31 is an embodiment of receiving means. The data-reproducing portion 31 receives items of the master data D0, D1, which have been divided into at least two parts, and each of which includes electronic signature and the public-key PK and the secret key SK each for determining whether the items of master data are legitimate. For example, DLT tapes 14A, 14B carried from the studio or the like are loaded onto the data-reproducing portion 31 wherein the items of the master data D0, D1 can be reproduced on the basis of the data-reproducing signal S21 transmitted from the control device 38.

The data separation portion 32 is connected to the data-reproducing portion 31. The data separation portion 32 receives the items of master data D0, D1 reproduced by the data-reproducing portion 31 to separate from them BD-ID-.DAT file, Signature.DAT file, UCD.DAT file, and BD-IMAGE.DAT file. When DLT tape 14A is loaded onto the data-reproducing portion 31 and reproduced, BD-ID-0.DAT file, Signature-0.DAT file, UCD-0.DAT file, and BD-IMAGE-0.DAT file, which are contained in Layer 0, are respectively separated from the master data D0 based on the data separation control signal S24 transmitted from the control device 38.

When DLT tape 14B is loaded onto the data-reproducing portion 31 and reproduced, BD-ID-1.DAT file, Signature-1.DAT file, UCD-1.DAT file, and BD-IMAGE-1.DAT file, which are contained in Layer 1, are respectively separated from the master data D1 based on the data separation control signal S24.

The MDC calculation portion 33 is connected to the data separation portion 32. The MDC calculation portion 33 can provide real data MDC' by performing the same calculation processing of hash function as that performed in the authoring apparatus 20. For example, when verifying the DLT tape 14A, based on the calculation control signal S25 transmitted from the control device 38, the MDC calculation portion 33 calculates hash function of BD-IMAGE-0.DAT file to obtain MDC01', hash function of UCD-0.DAT file to obtain MDC02', and hash function of BD-ID-0.DAT file to obtain MDC03'.

When verifying the DLT tape 14B, the MDC calculation portion 33 calculates hash function of BD-IMAGE-1.DAT file to obtain MDC11', hash function of UCD-1.DAT file to obtain MDC12', and hash function of BD-ID-1.DAT file to obtain MDC13'.

The memory 34 is connected to the data separation portion 32. The memory 34 illustratively stores Signature.DAT file separated from the master data D0 based on the data-writing/reading signal S22 transmitted from the control device 38. The MDC' calculation portion 35 is connected to the memory 34 and the MDC calculation portion 33. The MDC' calculation portion 35 calculates hash functions of MDC1 obtained from the MDC calculation portion 33 and MDC0 obtained from the memory 34 based on the calculation control signal S26 transmitted from the control device 38 to transmit MDC'.

The decoder 36 decodes SIGN=DSA(MDC) and Certificate of Signature.DAT file based on the decode control signal S23 transmitted from the control device 38 to transmit message digest code MDC". The DSA is a digital electronic signature algorithm generated by the electronic signature block 24. The MDC" is generated based on the public-key PK data and the secret key SK data. PK data is given by decoding Certificate that certifies an owner of contents. SK data is given by decoding SIGN=DSA(MDC) that indicates an electronic signature. MDC" is given by decoding the PK data and the SK data and transmitted to the verification portion 37.

The verification portion 37, which is an embodiment of determining means is connected to the decoder 36 and the MDC' calculation portion 35. The verification portion 37 determines whether the electronic signature is legitimate based on the MDC" for every part of the previously divided master data, in connection with the items of master data D0, D1 reproduced in the data-reproducing portion 31. For example, the verification portion 37 compares MDC" transmitted from the decoder 36 with MDC' transmitted from the MDC' calculation portion 35 based on the verification control signal S27 transmitted from the control device 38 to verify whether they are coincident with each other.

If they are coincident, the verification portion 37 transmits "Verified 0" indicating that the electronic signature is legitimate. If not, the verification portion 37 transmits "Failed 1" indicating that the electronic signature is forged. A result of verification on legitimacy of the electronic signature such as "Verified 0" or "Failed 1" is transmitted to the control device 38 and/or a disk-stamper-forming facility 15, not shown, or the like as the information Rout on the verification result.

Thus, since BD-image data is divided into two part, Layer 0 and Layer 1 when transmitting the data from the studio or the like, it is possible to perform a verification operation separately in a mastering process of BD-ROM at a disk-stamper-forming facility. Namely, if another data-verifying apparatus, which is the same as the data-verifying apparatus 30 shown in FIG. 3, is prepared to verify the divided BD-image data in parallel, this allows a period of time for verification to be shortened. It is to be noted that if the BD-image data is divided into N parts, a period of time for verification becomes almost one Nth.

First Embodiment of Video-Contents-Protection System

Figure 4:
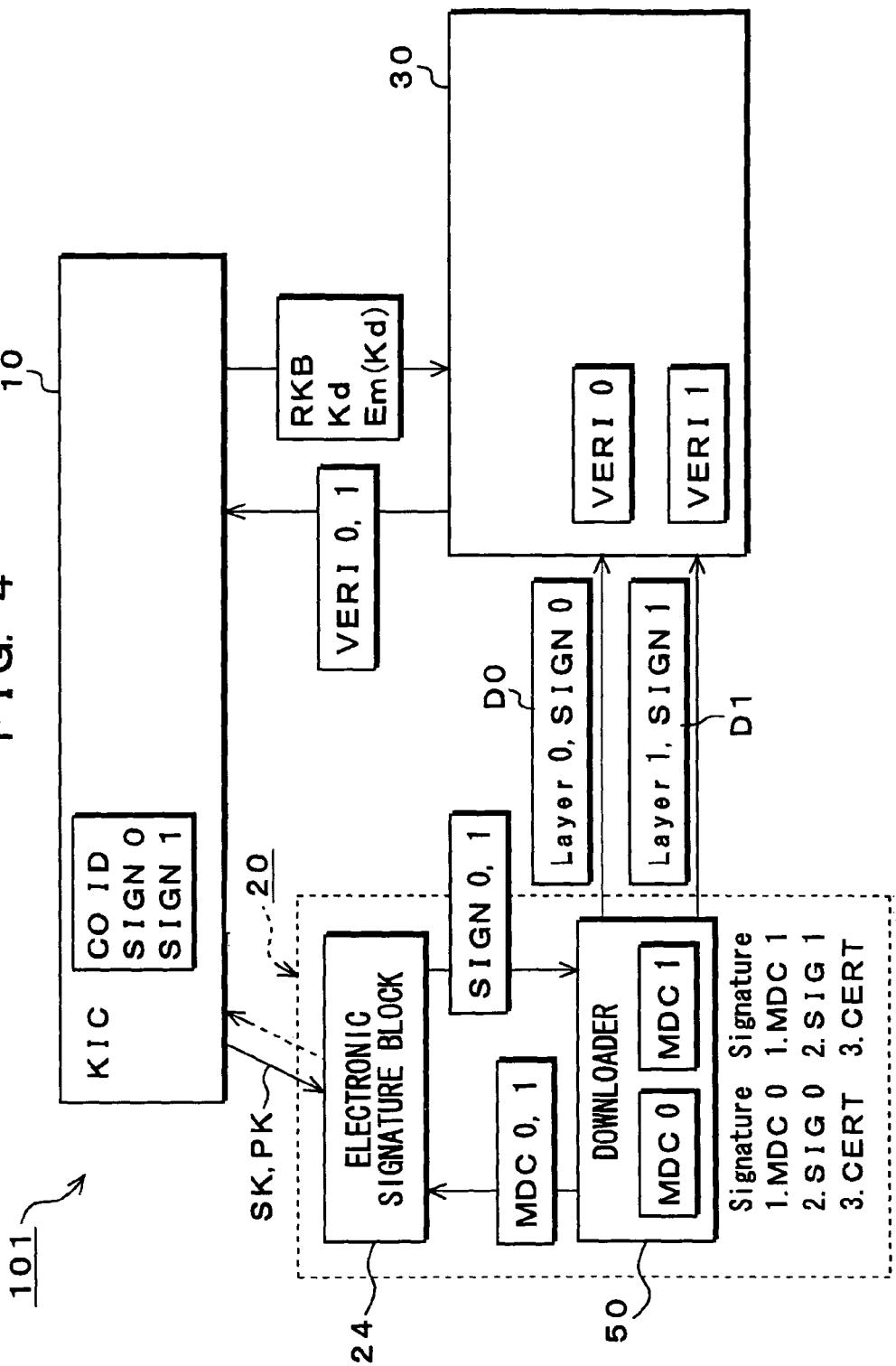
FIG. 4 is a block diagram for illustrating a configuration of, as a first embodiment, a video-contents-protection system 101 according to the present invention.

FIG. 4 is a block diagram for illustrating a configuration of, as a first embodiment, a video-contents-protection system 101 according to the present invention. In this embodiment, video contents having an amount of data of 50 GB is carried or transmitted from a studio to a disk-stamper-forming facility and MDC is added for every item of the master data D0, D1 so that these MDCs may become subject to writing of a signature to the disk.

In this embodiment, at a studio side, the video contents are divided into two parts and an electronic signature is added for every part of the divided BD-image data on a layer unit. DLT tapes 14A, 14B, which store each of two items of the master data D0, D1, that includes the electronic signature and Signature.DAT file (public-key PK data and secret-key SK data) for determining whether the electronic signature is legitimate, are carried (transferred) to the disk-stamper-forming facility.

It is supposed that the disk-stamper-forming facility receives DLT tapes 14A, 14B carried from the studio and determines whether the electronic signature is legitimate based on Signature.DAT file for every item of the master data D0, D1 on a layer unit, in connection with these items of master data, D0, D1.

The video-contents-protection system 101 shown in FIG. 4 is a first embodiment of the copyrighted work protection system 100 according to the present invention. KIC 10 distributes PK data and SK data to the electronic signature block 24 in the authoring apparatus 20. KIC 10 prepares and includes personal information (CO-ID) of an owner of contents (copyright), and electronic signatures SIGN0 and SIGN1. PK data and SK data are distributed on the basis of the personal information and the electronic signatures SIGN0 and SIGN1.

KIC 10 manages video contents using SIGN0=DSA (MDC0) or MDC0 so that the studio side can generate the master data D0 of Layer 0 and its MDC. KIC 10 also manages the video contents using SIGN1=DSA(MDC1) or MDC1 so that the studio side can generate the master data D1 of Layer 1 and its MDC.

When the video-contents are recorded with them being divided into two DLT tapes 14A, 14B, the downloader 50 generates a message digest code MDC0 relative to Layer 0 and a message digest code MDC1 relative to Layer 1. The downloader 50 transmits MDC0 and MDC1 to the electronic signature block 24. The electronic signature block 24 sends Signature-0.DAT file corresponding to the MDC0 of Layer 0, namely, electronic signature data D2=SIGN0 (=Signature-0.DAT) corresponding to the MDC0 of Layer 0, back to the downloader 50. "Signature" of Layer 0 includes 1. MDC0, 2. SIGN0, and 3. CERT.

The electronic signature block 24 also sends Signature-1.DAT file corresponding to the MDC1 of Layer 1, namely, electronic signature data D2=SIGN1 (=Signature-1.DAT) corresponding to the MDC1 of Layer 1, back to the downloader 50. "Signature" of Layer 1 includes 1. MDC1, 2. SIGN1, and 3. CERT.

In this system 101, the authoring apparatus 20 in the studio or the like transmits to the data-verifying apparatus 30 in the disk-stamper-forming facility or the like the master data D0 of Layer 0 and the electronic signature SIGN0 and the master data D1 of Layer 1 and the electronic signature SIGN1, respectively. The data-verifying apparatus 30 receives two DLT tapes carried from the studio or the like and determines whether the electronic signature is legitimate based on the PK data and the SK data for every item of the divided master data D0, D1, in connection with items of the master data D0, D1 reproduced from these DLT tapes 14A, 14B.

If the electronic signature in the master data D0 of Layer 0 is legitimate, the data-verifying apparatus 30 transmits VERI0. If the electronic signature in the master data D1 of Layer 1 is legitimate, the data-verifying apparatus 30 transmits VERI1. Thus, in the disk-stamper-forming facility, items of the master data D0, D1 can be processed with them being divided into two layers 0, 1.

If the electronic signature in the master data D0 of Layer 0 is forged, the data-verifying apparatus 30 transmits FAIL0. If the electronic signature in the master data D1 of Layer 1 is forged, the data-verifying apparatus 30 transmits FAIL1. Results of electronic signature legitimacy, VERI0 and VERI1 are notified to KIC 10. Receiving the notification, KIC 10 performs verification based on the results, VERI0 and VERI1. After the verification, KIC 10 distributes key-pair information, RKB, for manufacturing the disks, Kd, Em(Kd) and the like. This Kd indicates key information and the Em(Kd) indicates disk-manufacture-permission information or the like.

Figure 5:
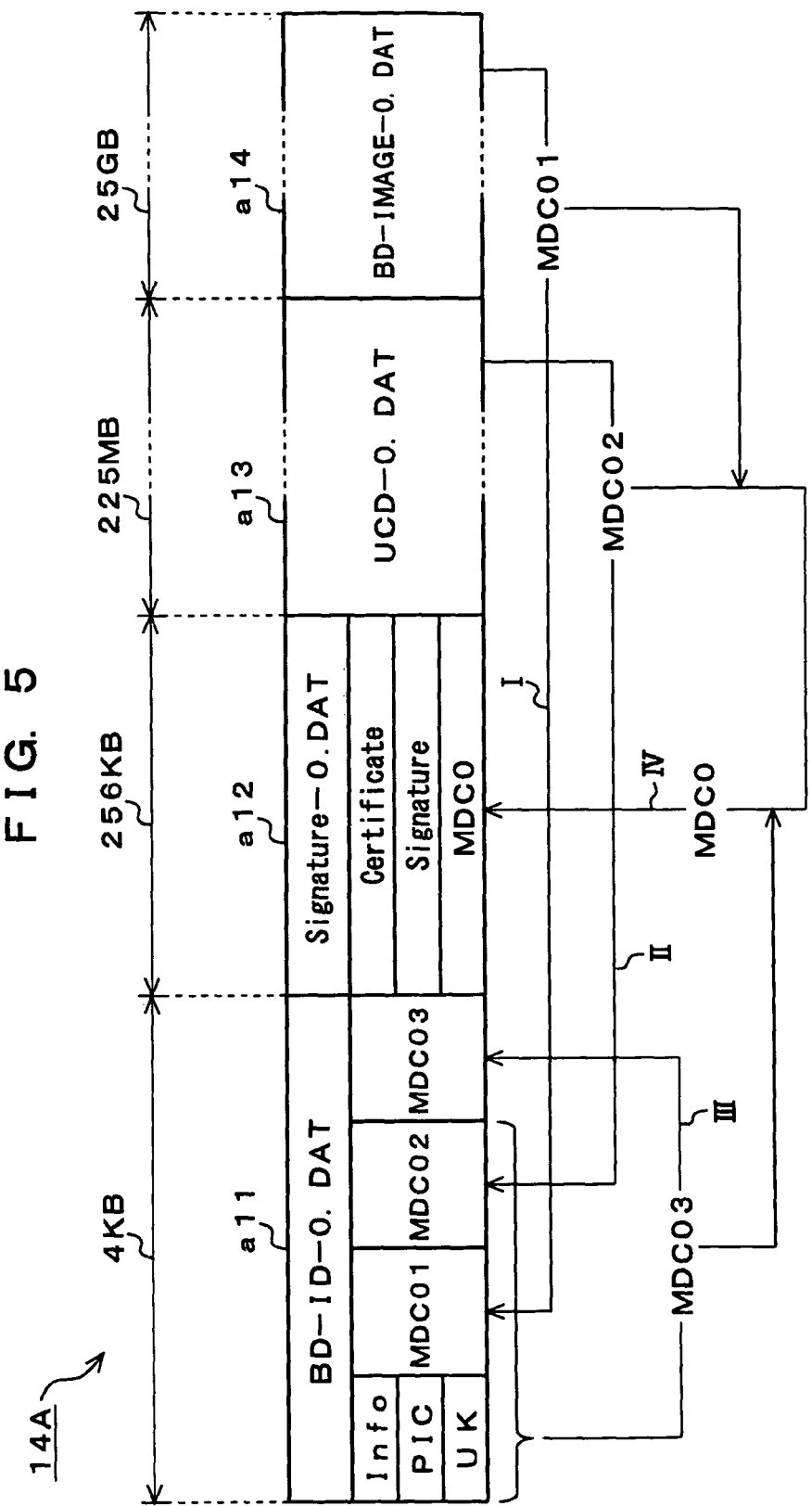
FIG. 5 is a diagram for illustrating a format of master data D0 recorded in a first DLT tape 14A.

FIG. 5 is a diagram for illustrating a record format of master data D0 recorded in the first DLT tape 14A. In this embodiment, when recording the master data D0 in the DLT tape 14A, regions a11 through a14 are illustratively assigned thereto. BD-ID-0.DAT file of 4 KB is written into the region a11. Signature-0.DAT file of 256 KB is written into the region a12. UCD-0.DAT file of 225 MB is written into the region a13. BD-IMAGE-0.DAT file of 25 GB is written into the region a14.

The BD-ID-0.DAT file in the region a11 includes information on owner (author) of copyright (info), PIC information, UK-Addr information, message digest codes MDC01, MDC02, and MDC03. MDC01 is a value obtained by calculating an expression, MDC01=SHA-1(BD-IMAGE-0.DAT) shown as route I. MDC02 is a value obtained by calculating an expression, MDC02=SHA-1(UDC-0.DAT) shown as route II. MDC03 is a value obtained by calculating an expression, MDC03=SHA-1(BD-ID-0.DAT without MDC03) shown as route III. "BD-ID-0.DAT without MDC03" means that the information on owner (author) of copyright (info), the PIC information, the UK-Addr information, and the message digest codes MDC01 and MDC02 excluding MDC03 from the BD-ID-0.DAT file are subject to calculation of hash function.

In the Signature-0.DAT file in the region a12, "Certificate" for certifying an owner of contents, "Signature" indicating an electronic signature, a message digest code MDC0, each of which included in Layer 0, are written. This MDC0 is a value obtained by calculating an expression, MDC0=SHA-1 (MDC01||MDC02||MDC03) shown as route IV.

FIG. 6 is a diagram for illustrating a format of master data D1 recorded in the second DLT tape 14B. In this embodiment, when recording the master data D1 in the DLT tape 14B, regions a21 through a24 are illustratively assigned thereto. BD-ID-1.DAT file of 4 KB is written into the region a21. Signature-1.DAT file of 256 KB is written into the region a22. UCD-1.DAT file of 225 MB is written into the region a23. BD-IMAGE-1.DAT file of 25 GB is written into the region a24.

The BD-ID-1.DAT file in the region a21 includes information on owner (author) of copyright (info), PIC information, UK-Addr information, message digest codes MDC11, MDC12, and MDC13. MDC11 is a value obtained by calculating an expression, MDC11=SHA-1(BD-IMAGE-1.DAT) shown as route I. MDC12 is a value obtained by calculating an expression, MDC12=SHA-1(UDC-1.DAT) shown as route II. MDC13 is a value obtained by calculating an expression, MDC13=SHA-1(BD-ID-1.DAT without MDC13) shown as route III. "BD-ID-1.DAT without MDC13" means that the information on owner (author) of copyright (info), the PIC information, the UK-Addr information, and the message digest codes MDC11 and MDC12 excluding MDC13 from the BD-ID-1.DAT file are subject to calculation of hash function.

In the Signature-1.DAT file in the region a22, "Certificate" for certifying an owner of contents, "Signature" indicating an electronic signature, a message digest code MDC1, each of which included in Layer 1, are written. This MDC1 is a value obtained by calculating an expression, MDC1=SHA-1 (MDC11∥MDC12∥MDC13) shown as route IV.

Figure 7A:
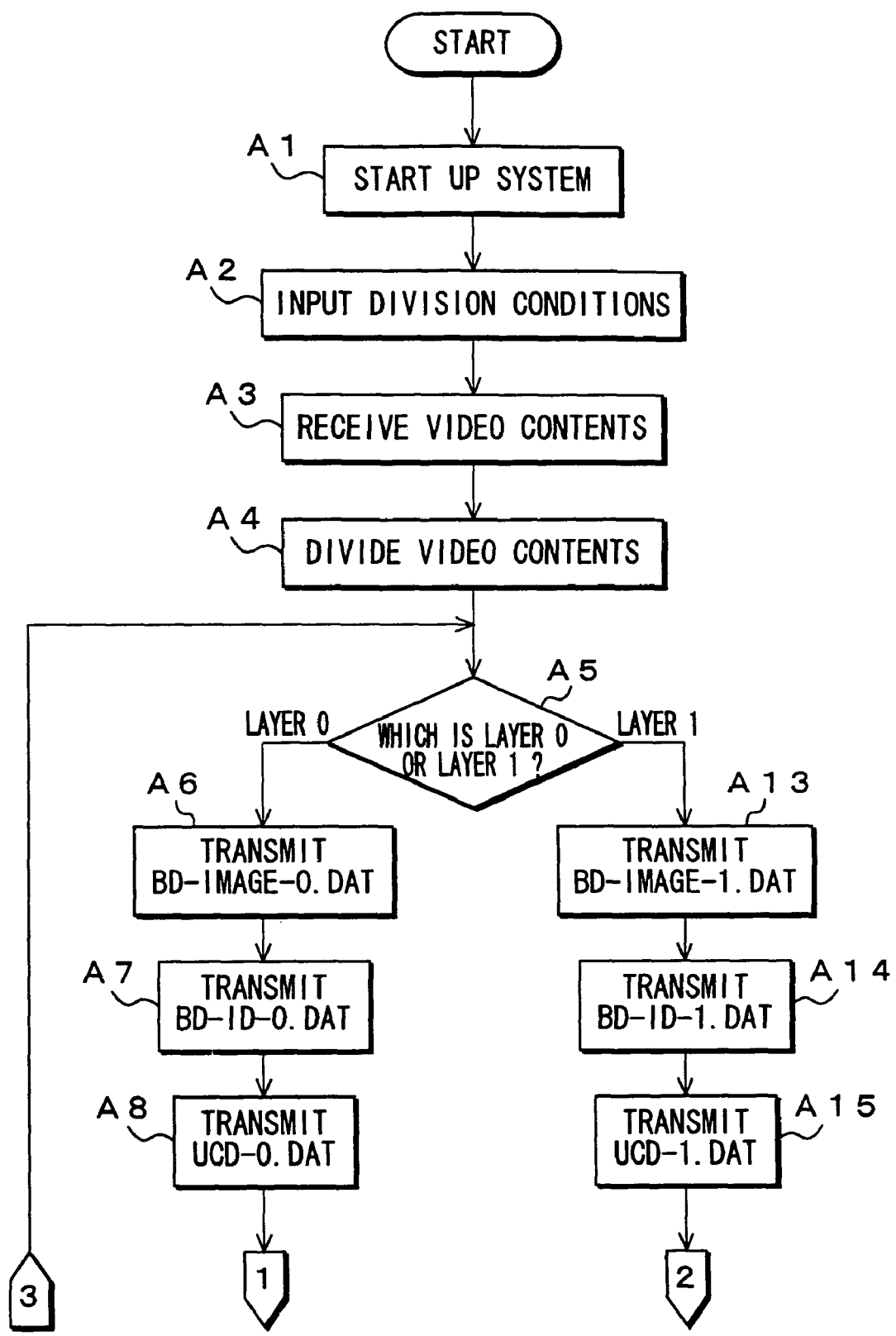
FIGS. 7A and 7B are flowcharts each showing first and second information-processing operation examples of the first embodiment of the video contents protection system 101 according to the present invention.
Figure 7B:
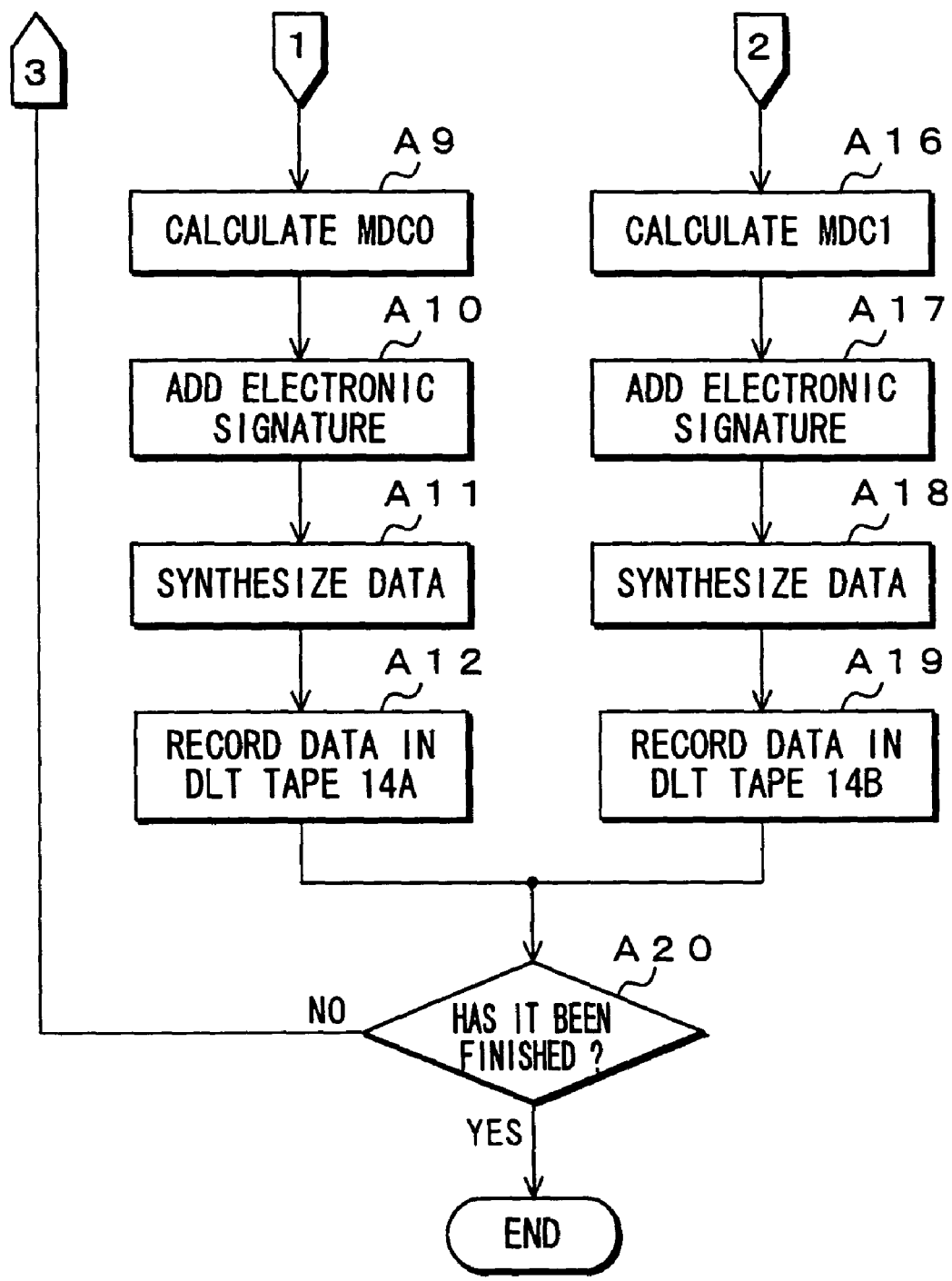

The following will describe a first embodiment of an information-processing method according to the invention. FIGS. 7A and 7B are flowcharts each showing first and second information-processing operation examples of an embodiment of the video-contents-protection system 101 according to the present invention. In this embodiment, the information-processing method in the studio side and that in the disk-stamper-forming facility side will be separately described.

Studio Side

At Step A1 of flowchart shown in FIG. 7A, the system is started up. For example, at power-on, CPU 55 of the authoring apparatus 20 shown in FIG. 2 reads the system program data from ROM 53 to RAM 54 to start up the system and controls the entire apparatus. For example, CPU 55 performs the control program to control input/output of each of the data-processing portion 21, the data-adding portion 22, the hash-function-calculating portion 23, the electronic signature block 24, the data-synthesizing portion 26, the monitor 28, and the tape-recording portion 29 on the basis of the operational data D13 obtained from the operation tool 27.

The process of this embodiment goes to Step A2 where a user operates the operation tool 27 to input conditions when video contents Din should be divided into two layers, Layer 0 and Layer 1. In this time, the monitor displays the division conditions into Layer 0 and Layer 1, disk-making information, and the like based on display data D14. The division conditions are instructed by operating the operation tool 27 so that image data can be divided relative to discontinuous portions of image, selector unit (64 or 24 K Bytes) of BD-ROM in the disk-stamper-forming apparatus 15 or the like. So, the user operates the operation tool 27 to add an electronic signature for every part of two items of BD-image data to be divided by the data-processing portion 21. The operational data D13 such as the division conditions and the electronic signature is transmitted to the control device 25.

At Step A3, the data-processing portion 21 receives the video contents Din. At Step A4, the data-processing portion 21 divides the video contents Din into two parts based on the division conditions according to the data-processing signal S11 transmitted from the control device 25. In this case, the video contents Din are divided into two parts according to a standard of user defined function (UDF) 2.5 so that two items of the BD-image data (BD-IMAGE-0.DAT and BD-IMAGE-1.DAT) to BD-ROM can be formed. The data-processing signal S11 includes the UK information and CPS information. The above information is described using XML.

The data-processing portion 21 converts a data ES of the video contents Din to a data TS of BD-ROM before or after the division and creates file system finally. In this embodiment, if the video contents have an amount of data of 50 GB, they are divided into two parts, BD-IMAGE-0.DAT file of Layer 0 having an amount of data of 25 GB and BD-IMAGE-1.DAT file of Layer 1 having an amount of data of 25 GB.

The process goes to Step A5 where it is determined whether of Layer 0 or Layer 1 is to be processed ahead. If Layer 0 is to be processed ahead, the process goes to step A6 where BD-image data of Layer 0 becomes BD-IMAGE-0.DAT file that is transmitted to the data-synthesizing portion 26.

The data-processing portion 21 further transmits address data disk divisional information, and the like, which are necessary for manufacturing DVD in the disk-stamper-forming facility, to the data-adding portion 22. The disk divisional information includes PIC information, UK information, and information on an owner (author) of copyright (info).

The process goes to Step A7 where the downloader 50 generates sub-information for disk-making based on various kinds of the information obtained from the data-processing portion 21 and the control device 25. The data-adding portion 22 transmits BD-ID-0.DAT file of 4 KB to the hash-function-calculating portion 23 and the data-synthesizing portion 26 based on the data-adding signal S12 transmitted from the control device 25. The data-adding signal S12 includes CPS-Unit information and PIC information. The above information is described using XML. Into BD-ID-0.DAT file, the information on an owner (author) of copyright (info), PIC-DAT(DI) data of 2 KB, and UK-addr data of 16 B are written.

The process then goes to Step A8 where the data-adding portion 22 transmits UCD-0.DAT file of 225 MB to the hash-function-calculating portion 23 and the data-synthesizing portion 26. These files are not limited in transmitting order so that they may be transmitted both prior to and subsequent to each other.

The process then goes to Step A9 where the hash-function-calculating portion 23 calculates a message digest code, MDC0. For example, The hash-function-calculating portion 23 calculates hash function of the BD-IMAGE-0.DAT transmitted from the data-processing portion 21 based on the calculation control signal S13 transmitted from the control device 25 to transmit message digest code, MDC01. This MDC01 is obtained by calculating the expression, MDC01=SHA-1(BD-IMAGE-0.DAT) shown as route I.

Similarly, the hash-function-calculating portion 23 calculates the hash function of UCD-0.DAT to obtain MDC02. MDC02 is obtained by calculating an expression, MDC02=SHA-1(UDC-0.DAT) shown as route II. Further, the hash-function-calculating portion 23 calculates the hash functions of the information on owner (author) of copyright (info), the PIC information, the UK-Addr information, and the MDC01 and MDC02 excluding MDC03 from the BD-ID-0.DAT file to obtain MDC03. MDC03 is obtained by calculating an expression, MDC03=SHA-1(BD-ID-0.DAT without MDC03) shown as route III.

The hash-function-calculating portion 23 further calculates the hash functions of MDC01, MDC02, and MDC03 to obtain MDC0. MDC0 is obtained by calculating an expression, MDC0=SHA-1(MDC01∥MDC02∥MDC03) shown as route IV. MDC0 thus obtained is transmitted to the electronic signature block 24 from the hash-function-calculating portion 23.

The process goes to step A10 where an electronic signature is added to BD-image data of Layer 0. The electronic signature block 24 adds a digital electronic signature based on the electronic signature control signal S14 transmitted from the control device 25, a secret key of owner of contents (copyright) and a public-key, which are obtained from KIC 10, to generate the electronic signature data D2 (=Signature-0.DAT file). Signature-0.DAT file has an amount of data having 256 KB and is added for verifying that BD-IMAGE-0.DAT file, UDC-0.DAT file, or BD-ID-0.DAT file is legitimate. To the Signature-0.DAT file, MDC0, "Signature" indicating the electronic signature, and "Certificate" for certifying an owner of copyright (contents) are written. The electronic signature data D2 is transmitted from electronic signature block 24 back to the data-synthesizing portion 26.

The process goes to Step A11 where the data-synthesizing portion 26 synthesizes the BD-ID-0.DAT file, Signature-0.DAT file, UCD-0.DAT file, and BD-IMAGE-0.DAT file based on the data synthesis control signal S15 transmitted from the control device 25 to generate the master data D0. In this time, as shown in FIG. 5, the data-synthesizing portion 26 writes BD-ID-0.DAT file into the region a11, Signature-0.DAT file into the region a12, UCD-0.DAT file into the region a13, and BD-IMAGE-0.DAT file into the region a14, respectively.

Thus, at Step A12, the master data D0 of Layer 0 composed of four files is recorded on HDD 17 or DLT tape 14A. In this embodiment, the master data D0 is recorded on DLT tape 14A concerning Layer 0 based on the data-recording-control signal S16 transmitted from the control device 25. The process then goes to Step A20 where it is determined whether the process has been finished. In this embodiment, processing for Layer 1 is remained so that the process goes back to Step A5.

At Step A5, the process goes to Step A13 where processing for Layer 1 is performed. BD-image data of Layer 1 becomes BD-IMAGE-1.DAT file that is transmitted to the data-synthesizing portion 26. The process goes to Step A14 where the downloader 50 generates sub-information for disk-making based on various kinds of the information obtained from the data-processing portion 21 and the control device 25. The data-adding portion 22 transmits BD-ID-1.DAT file of 4 KB to the hash-function-calculating portion 23 and the data-synthesizing portion 26 based on the data-adding signal S12 transmitted from the control device 25.

The process then goes to Step A15 where the data-adding portion 22 transmits UCD-1.DAT file of 225 MB to the hash-function-calculating portion 23 and the data-synthesizing portion 26.

The process then goes to Step A16 where the hash-function-calculating portion 23 calculates a message digest code, MDC1. For example, The hash-function-calculating portion 23 calculates hash function of the BD-IMAGE-1.DAT transmitted from the data-processing portion 21 based on the calculation control signal S13 transmitted from the control device 25 to transmit message digest code, MDC11. This MDC11 is obtained by calculating the expression, MDC11=SHA-1(BD-IMAGE-1.DAT) shown as route I.

Similarly, the hash-function-calculating portion 23 calculates the hash function of UCD-1.DAT to obtain MDC12. MDC12 is obtained by calculating an expression, MDC12=SHA-1(UDC-0.DAT) shown as route II. Further, the hash-function-calculating portion 23 calculates the hash functions of the information on owner (author) of copyright (info), the PIC information, the UK-Addr information, and the MDC11 and MDC12 excluding MDC13 from the BD-ID-1.DAT file to obtain MDC13. MDC13 is obtained by calculating an expression, MDC13=SHA-1(BD-ID-1.DAT without MDC13) shown as route III.

The hash-function-calculating portion 23 further calculates the hash functions of MDC1, MDC12, and MDC13 to obtain MDC1. MDC1 is obtained by calculating an expression, MDC1=SHA-1(MDC01∥MDC02∥MDC03) shown as route IV. MDC1 thus obtained is transmitted to the electronic signature block 24 from the hash-function-calculating portion 23.

The process goes to step A17 where an electronic signature is added to BD-image data of Layer 1. The electronic signature block 24 adds a digital electronic signature based on the electronic signature control signal S14 transmitted from the control device 25, a secret key of owner of contents (copyright) and a public-key, which are obtained from KIC 10, to generate the electronic signature data D2 (=Signature-1.DAT file). Signature-1.DAT file has an amount of data having 256 KB and is added for verifying that BD-IMAGE-1.DAT file, UDC-1.DAT file, or BD-ID-1.DAT file is legitimate. To the Signature-1.DAT file, MDC1 "Signature" indicating the electronic signature, and "Certificate" for certifying an owner of copyright (contents) are written. The electronic signature data D2 is transmitted from the electronic signature block 24 back to the data-synthesizing portion 26.

The process goes to Step A18 where the data-synthesizing portion 26 synthesizes the BD-ID-1.DAT file, Signature-1.DAT file, UCD-1.DAT file, and BD-IMAGE-1.DAT file based on the data synthesis control signal S15 transmitted from the control device 25 to transmit the master data D1.

In this time, as shown in FIG. 6, the data-synthesizing portion 26 writes BD-ID-1.DAT file into the region a21, Signature-1.DAT file into the region a22, UCD-1.DAT file into the region a23, and BD-IMAGE-1.DAT file into the region a24, respectively.

Thus, at Step A19, the master data D1 of Layer 1 composed of four files is recorded on HDD 17 or DLT tape 14B. In this embodiment, the master data D1 is recorded on DLT tape 14B concerning Layer 1 based on the data-recording-control signal S16 transmitted from the control device 25. These DLT tapes 14A, 14B into which the electronic signature is added are carried from the studio to the disk-stamper-forming facility.

Disk-Stamper-Forming Facility Side

Figure 8A:
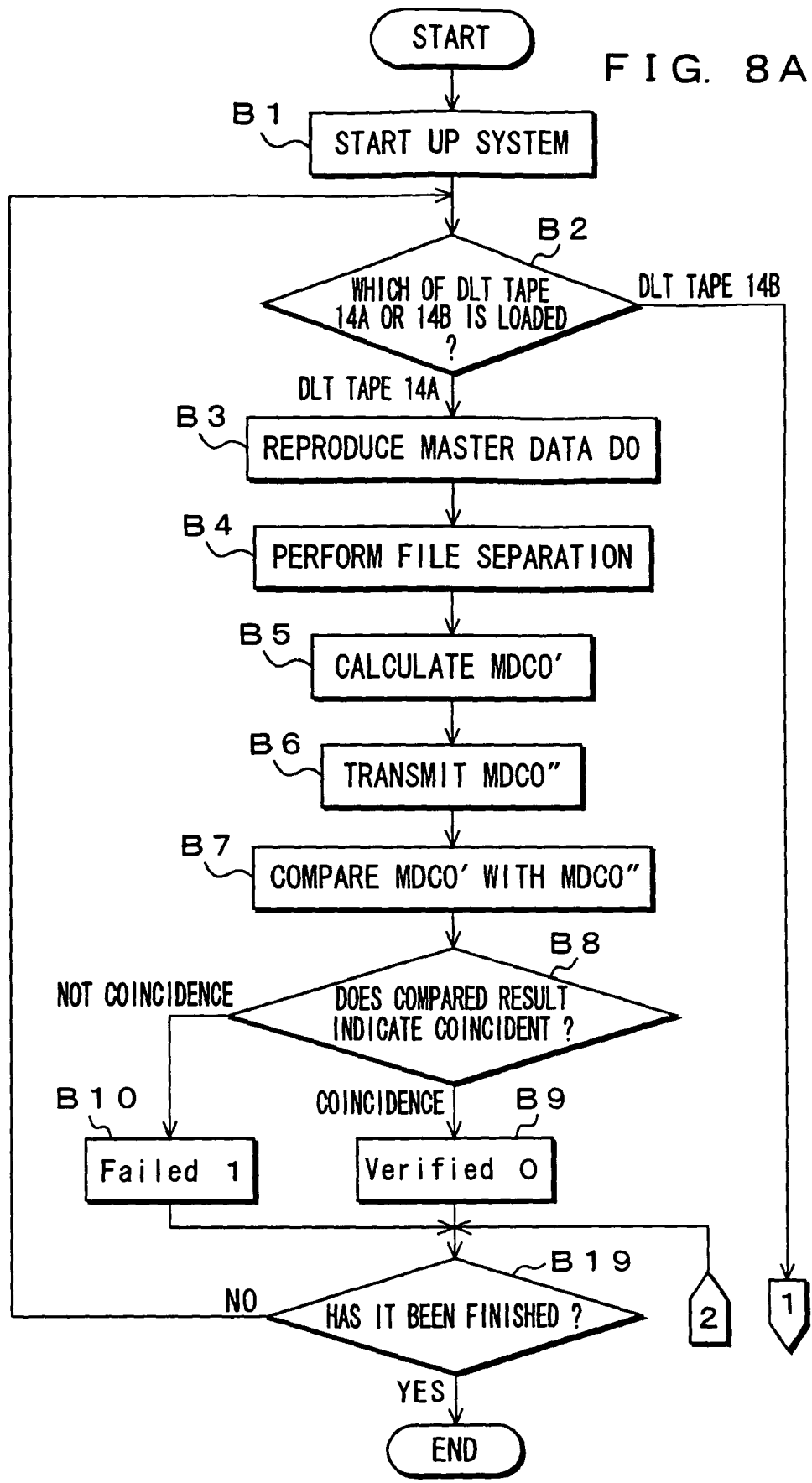
FIGS. 8A and 8B are flowcharts each showing first and second data-verifying operation examples of a first embodiment of the data-verifying apparatus 30 according to the present invention.
Figure 8B:
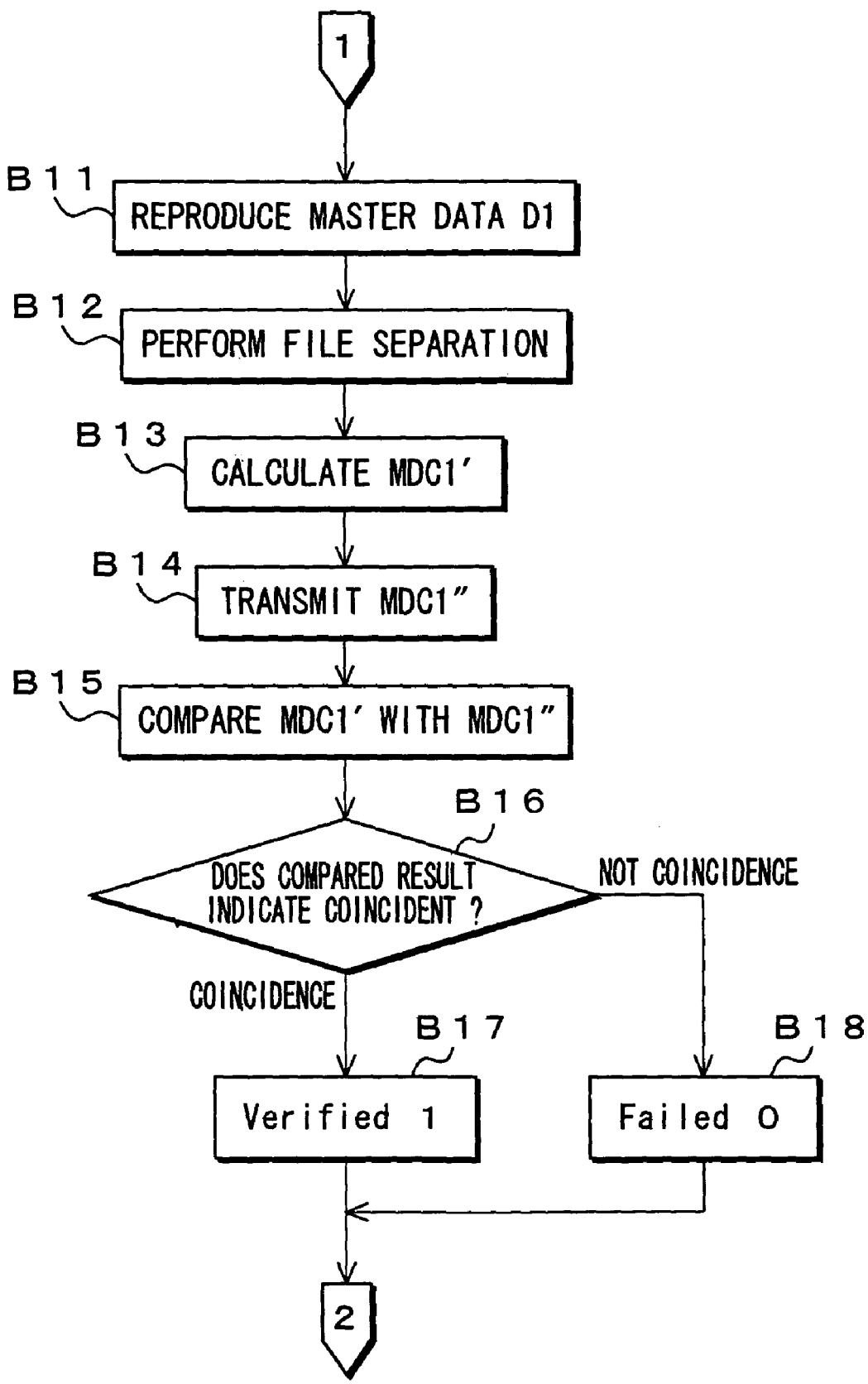

FIGS. 8A and 8B are flowcharts each showing first and second data-verifying operation examples of a first embodiment of the data-verifying apparatus 30 according to the present invention.

At Step B1 of flowchart shown in FIG. 8A, the system is started up. For example, at power-on, CPU 85 of the data-verifying apparatus 30 shown in FIG. 3 reads the system program data from ROM 83 to RAM 84 to start up the system and controls the entire apparatus. For example, CPU 85 performs the control program to control input/output of each of the data-reproducing portion 31, the data separation portion 32, the MDC calculation portion 33, the memory 34, the MDC' calculation portion 35, the decoder 36, the verification portion 37, the monitor 40 and the like on the basis of the operational data D23 obtained from the operation tool 39.

The process goes to Step B2 where it is determined whether of DLT tape 14A or 14B is loaded onto the data reproducing portion 31. If DLT tape 14A carried from a studio or the like is loaded onto the data-reproducing portion 31 at Step B2, the process goes to step B3 where the master data D0 is reproduced based on the data-reproducing signal S21 transmitted from the control device 38. The master data D0 reproduced in the data-reproducing portion 31 is transmitted to the data separation portion 32.

At Step B4, the data separation portion 32 separates from the master data D0 the BD-ID-0.DAT file, Signature-0.DAT file, UCD-0.DAT file, and BD-IMAGE-0.DAT file, which are included in Layer 0, based on the data separation signal S24. In this time, the Signature-0.DAT file separated from the master data D0 is stored in the memory 34 based on the data-writing/reading signal S22.

The process goes to Step B5 where the MDC calculation portion 33 obtains real data MDC0' by performing the same calculation processing of hash function as that performed in the authoring apparatus 20. For example, the MDC calculation portion 33 receives the BD-ID-0.DAT file, Signature-0.DAT file, UCD-0.DAT file, and BD-IMAGE-0.DAT file, which are included in Layer 0, from the data separation portion 32. The MDC calculation portion 33 then, based on the calculation control signal S25, calculates hash function of BD-IMAGE-0.DAT file to obtain MDC01', hash function of UCD-0.DAT file to obtain MDC02', and hash function of BD-ID-0.DAT file to obtain MDC03'.

Referring to FIG. 5, this MDC01' is a value obtained by calculating an expression, MDC01'=SHA-1(BD-IMAGE-0.DAT) shown as route I. MDC02' is a value obtained by calculating an expression, MDC02'=SHA-1(UDC-0.DAT) shown as route II. MDC03' is a value obtained by calculating an expression, MDC03'=SHA-1(BD-ID-0.DAT without MDC03') shown as route III. "BD-ID-0.DAT without MDC03'" means that the information on owner (author) of copyright (info), the PIC information, the UK-Addr information, and the message digest codes MDC01' and MDC02' excluding MDC03' from the BD-ID-0.DAT file are subject to calculation of hash function.

The MDC' calculation portion 35 calculates hash functions of MDC0' obtained from the MDC calculation portion 33 and MDC0 obtained from the memory 34 to transmit MDC' based on the calculation control signal S26. Referring to FIG. 5, this MDC0' is a value obtained by calculating an expression, MDC0'=SHA-1(MDC01'∥MDC02'∥MDC03') shown as route IV.

At Step B6, the decoder 36 receives Signature-0.DAT file read out of the memory 34 and decodes SIGN=DSA(MDC) and Certificate of Signature-0.DAT file based on the decode control signal S23 to transmit message digest code MDC". The MDC" is transmitted to the verification portion 37.

The process goes to Step B7 where the verification portion 37 compares MDC" received from the decoder 36 with MDC' received from the MDC' calculation portion 35 based on the verification control signal S27 to verify whether they are coincident with each other. The process goes to Step B8 where it is determined whether the compared result indicates coincidence.

If the MDC" received from the decoder 36 and the MDC' received from the MDC' calculation portion 35 are coincident, the process goes to Step B9 where the verification portion 37 transmits "Verified 0" indicating that the electronic signature is legitimate. If not, the process goes to Step B10 where the verification portion 37 transmits "Failed 1" indicating that the electronic signature is forged. Thus, the DLT tape 14A is verified.

The process then goes to Step B19 where it is determined whether the process has been finished. In this embodiment, verification of DLT tape 14B is remained so that the process goes back to Step B2.

At Step B2, if DLT tape 14B carried from the studio or the like is loaded onto the data-reproducing portion 31, the process goes to step B11 shown in FIG. 8B where the master data D1 is reproduced based on the data-reproducing signal S21 transmitted from the control device 38. The master data D1 reproduced in the data-reproducing portion 31 is transmitted to the data separation portion 32.

The data separation portion 32 separates from the master data D1 the BD-ID-1.DAT file, Signature-1.DAT file, UCD-1.DAT file, and BD-IMAGE-1.DAT file, which are included in Layer 1, based on the data separation signal S24. In this time, the Signature-1.DAT file separated from the master data D1 is stored in the memory 34 based on the data-writing/reading signal S22.

The process goes to Step B13 where the MDC calculation portion 33 obtains real data MDC1' by performing the same calculation processing of hash function as that performed in the authoring apparatus 20. For example, the MDC calculation portion 33 receives the BD-ID-1.DAT file, Signature-1.DAT file, UCD-1.DAT file, and BD-IMAGE-1.DAT file, which are included in Layer 1, from the data separation portion 32.

The MDC calculation portion 33 then, based on the calculation control signal S25, calculates hash function of BD-IMAGE-1.DAT file to obtain MDC11', hash function of UCD-1.DAT file to obtain MDC12', and hash function of BD-ID-1.DAT file to obtain MDC13'.

Referring to FIG. 6, this MDC11' is a value obtained by calculating an expression, MDC11'=SHA-1(BD-IMAGE-1.DAT) shown as route I. MDC12' is a value obtained by calculating an expression, MDC12'=SHA-1(UDC-1.DAT) shown as route II. MDC13' is a value obtained by calculating an expression, MDC13'=SHA-1(BD-ID-1.DAT without MDC13') shown as route III. "BD-ID-0.DAT without MDC13'" means that the information on owner (author) of copyright (info), the PIC information, the UK-Addr information, and the message digest codes MDC11' and MDC12' excluding MDC13' from the BD-ID-1.DAT file are subject to calculation of hash function.

The MDC' calculation portion 35 calculates hash functions of MDC1' obtained from the MDC calculation portion 33 and MDC1 obtained from the memory 34 to transmit MDC' based on the calculation control signal S26. Referring to FIG. 6, this MDC1' is a value obtained by calculating an expression, MDC1'=SHA-1(MDC11'∥MDC12'∥MDC13') shown as route IV.

At Step B14, the decoder 36 receives Signature-1.DAT file read out of the memory 34 and decodes SIGN=DSA(MDC) and Certificate of Signature-1.DAT file based on the decode control signal S23 to transmit message digest code MDC". The MDC" is transmitted to the verification portion 37.

The process goes to Step B15 where the verification portion 37 compares MDC" received from the decoder 36 with MDC' received from the MDC' calculation portion 35 based on the verification control signal S27 to verify whether they are coincident with each other. The process goes to Step B16 where it is determined whether the compared result indicates coincidence.

If the MDC" received from the decoder 36 and the MDC' received from the MDC' calculation portion 35 are coincident, the process goes to Step B17 where the verification portion 37 transmits "Verified 1" indicating that the electronic signature is legitimate. If not, the process goes to Step B18 where the verification portion 37 transmits "Failed 0" indicating that the electronic signature is forged. Thus, the DLT tape 14B is verified. These verification results such as "Verified 0" indicating that the electronic signature is legitimate or "Failed 1" indicating that the electronic signature is forged are transmitted to the control device 38, a disk-stamper-forming facility 15, not shown, and the like as the information Rout on a verification result. The process then goes to Step B19 where power-off information and the like are detected to finish the processing.

Thus, according to the first embodiment of the video contents protection system 101 according to the present invention, if processing BD-image data of 50 GB, this invention is applied to the authoring apparatus 20 and the data-verifying apparatus 30 so that the authoring apparatus 20 divides the BD-image data into two parts, BD-IMAGE-0.DAT file of 25 GB and BD-IMAGE-1.DAT file of 25 GB, and adds an electronic signature for every part to transmit items of the master data D0, D1 which includes the electronic signature and Signature.DAT file for verifying whether the electronic signature is legitimate.

The data-verifying apparatus 30 determines whether the electronic signature is legitimate based on MDC0 and MDC1 of Signature.DAT file for every item of the divided master data D0, D1, in connection with DLT tapes 14A, 14B carried from the authoring apparatus 20.

Therefore, it is possible that a receiving side carries out identification of the transmitting side in connection with the items of the received master data D0, D1 and briefly and easily identifies or verifies that each of the items of the master data D0, D1 is not forged or manipulated for each of the items of the divided master data D0, D1.

It is to be noted that since MDC is formed from the divided data, processing period of time for processing the electronic signature in the data-verifying apparatus 30 can be shortened. In the data-verifying apparatus 30, a check may be performed on a layer unit, thereby shortening verification time. Further, since MDC is formed for each of the layers or files, if a file is modified, it is useful that only MDC relative to this modified file may be made again.

Second Embodiment of Video-Contents-Protection System

Figure 9:
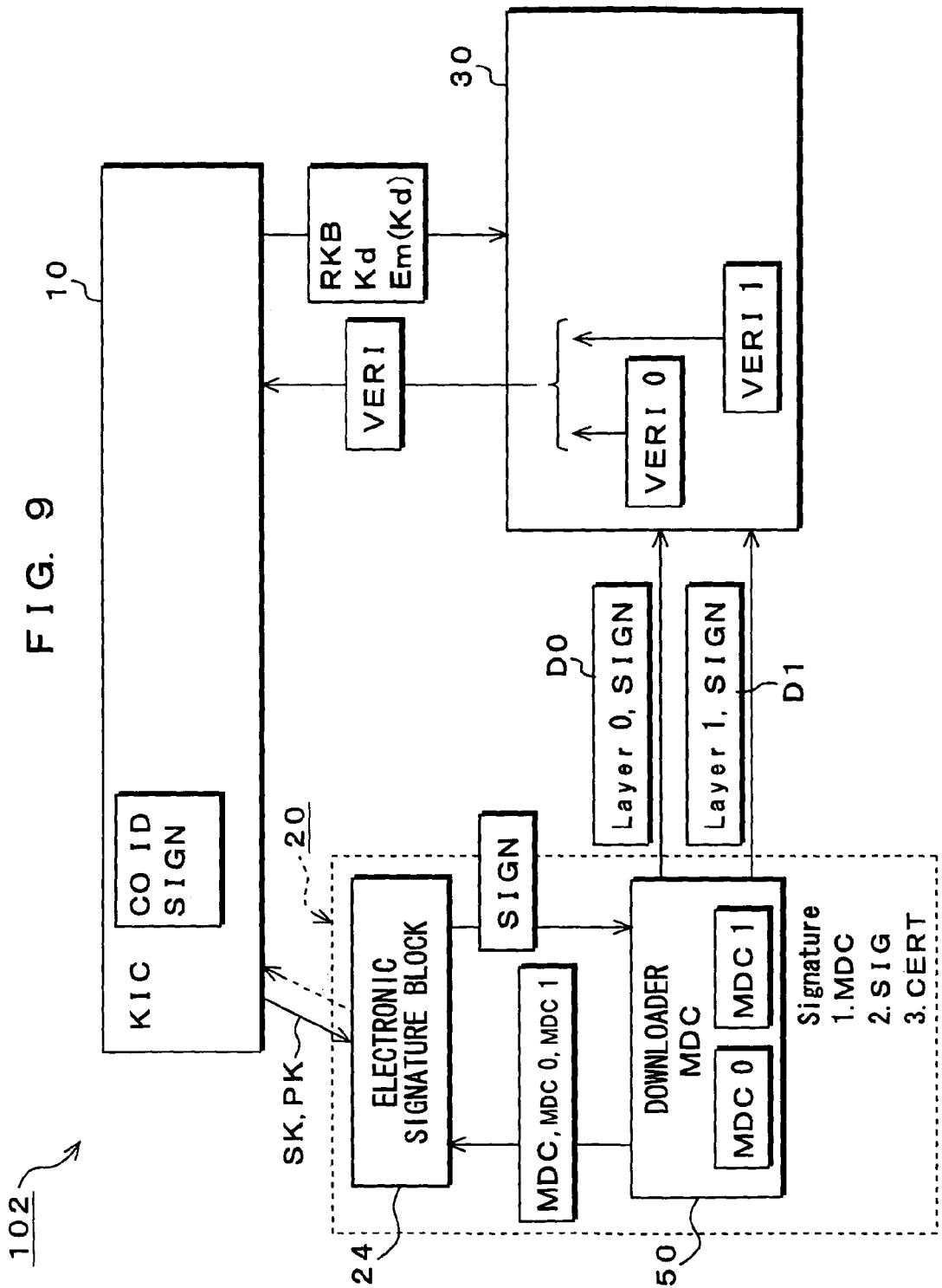
FIG. 9 is a block diagram for illustrating a configuration of, as a second embodiment, a video contents protection system 102 according to the present invention.

FIG. 9 is a block diagram for illustrating a configuration of, as a second embodiment, a video-contents-protection system 102 according to the present invention. In this embodiment, video contents having an amount of data of 50 GB is carried or transmitted from a studio to a disk-stamper-forming facility and MDC is added for every item of the master data D0, D1 but is different from that of the first embodiment of video-contents-protection system in that, in the disk-stamper-forming facility, electronic signatures in Layers 0 and 1 can be separately checked by writing into the electronic signature data D2 of the corresponding Layer the MDC of the other Layer.

Namely, in the first embodiment, two electronic signatures, SIGN0 and SIGN1, are presented while in this second embodiment, the only one electronic signature, SIGN is presented, so that light management loads in KIC 10 can be achieved. It is supposed that the disk-stamper-forming facility receives DLT tapes 14A', 14B' carried from the studio, and in connection with these DLT tapes 14A' and 14B', one MDC is calculated based on MDC0 of the corresponding Layer 0 and MDC1 of the other Layer 1 for every item of the divided master data D0, D1 on layer unit so that, based on this MDC, it is determined whether the electronic signature in the corresponding DLT tape is legitimate.

The video-contents-protection system 102 shown in FIG. 9 is a second embodiment of the copyrighted work protection system 100 according to the present invention. KIC 10 distributes PK data and SK data to the electronic signature block 24 in the authoring apparatus 20, which is the same procedure as that of the first embodiment. KIC 10 prepares personal information (CO-ID) of an owner of contents (copyright), and electronic signature SIGN. PK data and SK data are distributed on the basis of the personal information CO-ID and the electronic signature SIGN.

Namely, KIC 10 manages video contents using SIGN=DSA (MDC) or MDC so that the studio side can generate the master data D0 of Layer 0 and its MDC and the master data D1 of Layer 1 and its MDC. This MDC is obtained using the expression, MDC=SHA-1 (MDC0∥MDC1). Management information on copyrighted works to be managed in KIC 10 relative to a large amount of video-contents-data is made limited to one MDC or the electronic signature data D2, which achieves the light management loads in KIC 10, thereby simplifying management on copyrighted works.

When the video contents are recorded with them being divided into two DLT tapes 14A', 14B', the downloader 50 generates a message digest code MDC0 of Layer 0 and a message digest code MDC1 of Layer 1, which is the same procedure as that of the first embodiment. Further, the downloader 50 calculates the expression, MDC=SHA-1 (MDC0∥MDC1) and transmits MDC0 and MDC1 to the electronic signature block 24. The electronic signature block 24 sends the electronic signature data D2=SIGN (=Signature-.DAT file) corresponding to both of the Layers 0 and 1, back to the downloader 50. Signature.DAT file includes 1. MDC, 2. SIGN, and 3. CERT.

In this system 102, the authoring apparatus 20 in the studio or the like transmits to the data-verifying apparatus 30 in the disk-stamper-forming facility or the like the master data D0 of Layer 0 and its electronic signature SIGN and the master data D1 of Layer 1 and its electronic signature SIGN, respectively. The data-verifying apparatus 30 receives two DLT tapes carried from the studio or the like and determines whether the electronic signature is legitimate based on the Signature.DAT file for every item of the divided master data D0, D1, in connection with each of items of the master data D0, D1 reproduced from these DLT tapes 14A', 14B'.

In a similar way of the first embodiment, if the electronic signature in the master data D0 of Layer 0 is legitimate, the data-verifying apparatus 30 transmits VERI0. If the electronic signature in the master data D1 of Layer 1 is legitimate, the data-verifying apparatus 30 transmits VERI1. VERI0 and VERI1 are consolidated to VERI. Thus, in the disk-stamper-forming facility, items of the master data D0, D1 can be separately processed for every layer, Layer 0, 1.

If the electronic signature in the master data D0 of Layer 0 is forged, the data-verifying apparatus 30 transmits FAIL0. If the electronic signature in the master data D1 of Layer 1 is forged, the data-verifying apparatus 30 transmits FAIL1. Result of electronic signature legitimacy, VERI is notified to KIC 10. Receiving the notification, KIC 10 performs verification based on the result, VERI. After verification, KIC 10 distributes key-pair information, RKB, for manufacturing the disk, Kd, Em(Kd) and the like.

FIG. 10 is a diagram for illustrating a format of master data D0 recorded in the first DLT tape 14A'. In this embodiment, as shown in FIG. 10, when recording the master data D0 in the DLT tape 14A', regions a31 through a34 are illustratively assigned thereto. BD-ID-0.DAT file of 4 KB is written into the region a31. Signature.DAT file of 256 KB is written into the region a32. UCD-0.DAT file of 225 MB is written into the region a33. BD-IMAGE-0.DAT file of 25 GB is written into the region a34.

The BD-ID-0.DAT file in the region a31 includes information on owner (author) of copyright (info), PIC information, UK-Addr information, message digest codes MDC01, MDC02, and MDC03. MDC01 is a value obtained by calculating an expression, MDC01=SHA-1(BD-IMAGE-0.DAT) shown as route I. MDC02 is a value obtained by calculating an expression, MDC02=SHA-1(UDC-0.DAT) shown as route II. MDC03 is a value obtained by calculating an expression, MDC03=SHA-1(BD-ID-0.DAT without MDC03) shown as route III. "BD-ID-0.DAT without MDC03" means that the information on owner (author) of copyright (info), the PIC information, the UK-Addr information, and the message digest codes MDC01 and MDC02 excluding MDC03 from the BD-ID-0.DAT file are subject to calculation of hash function.

In the Signature.DAT file in the region a32, "Certificate" for certifying an owner of contents of Layers 0, 1, "Signature" indicating an electronic signature thereof, message digest codes MDC, MDC0, and MDC1 are written. This MDC0 is a value obtained by calculating an expression, MDC0=SHA-1 (MDC01∥MDC02∥MDC03) shown as route IV. MDC1 is a value obtained from the master data D1 of Layer 1 shown as route V. MDC is a value obtained by calculating an expression, MDC=SHA-1(MDC0∥MDC1) shown as route VI.

FIG. 11 is a diagram for illustrating a format of master data D1 recorded in the second DLT tape 14B'. In this embodiment, when recording the master data D1 in the DLT tape 14B', regions a41 through a44 are illustratively assigned thereto. BD-ID-1.DAT file of 4 KB is written into the region a41. Signature.DAT file of 256 KB is written into the region a42. UCD-1.DAT file of 225 MB is written into the region a43. BD-IMAGE-1.DAT file of 25 GB is written into the region a44.

The BD-ID-1.DAT file in the region a41 includes information on owner (author) of copyright (info), PIC information, UK-Addr information, message digest codes MDC11, MDC12, and MDC13. This MDC11 is a value obtained by calculating an expression, MDC11=SHA-1(BD-IMAGE-1.DAT) shown as route I. MDC12 is a value obtained by calculating an expression, MDC12=SHA-1(UDC-1.DAT) shown as route II. MDC13 is a value obtained by calculating an expression, MDC13=SHA-1(BD-ID-1.DAT without MDC13) shown as route III. "BD-ID-1.DAT without MDC13" means that the information on owner (author) of copyright (info), the PIC information, the UK-Addr information, and the message digest codes MDC11 and MDC12 excluding MDC13 from the BD-ID-1.DAT file are subject to calculation of hash function.

In the Signature-1.DAT file in the region a42, "Certificate" for certifying an owner of contents, "Signature" indicating an electronic signature thereof, message digest codes MDC, MDC0, and MDC1 are written. This MDC1 is a value obtained by calculating an expression, MDC1=SHA-1 (MDC11∥MDC12∥MDC13) shown as route IV. MDC0 is a value obtained from the master data D0 of Layer 0 shown as route V. MDC is a value obtained by calculating an expression, MDC=SHA-1(MDC0∥MDC1) shown as route VI.

Figure 12B:
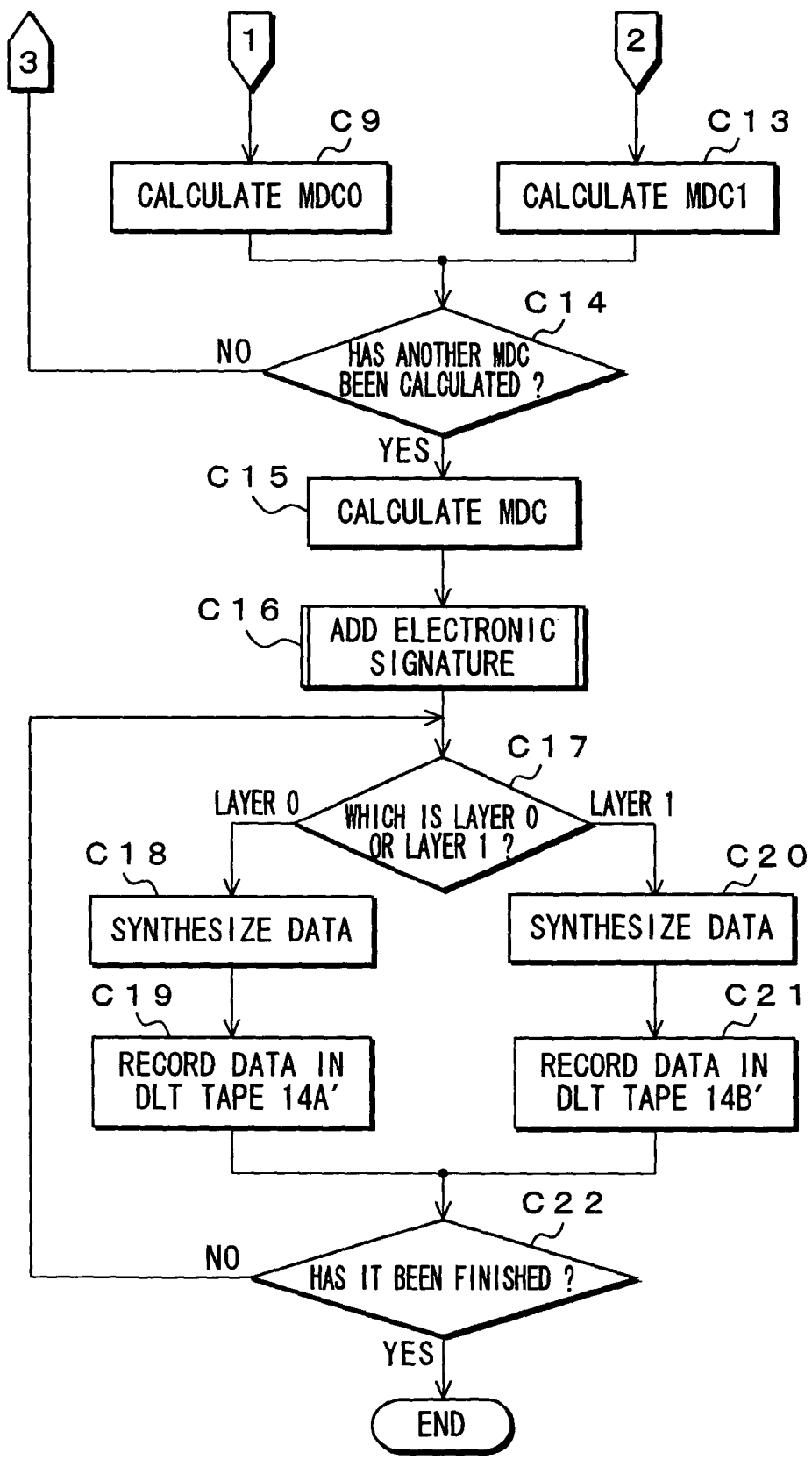

The following will describe a second embodiment of an information-processing method according to the invention. FIGS. 12A and 12B are flowcharts each showing first and second information-processing operation examples of an embodiment of the video-contents-protection system 102 according to the present invention. In this embodiment, the information-processing method in the studio side and that in the disk-stamper-forming facility side will be separately described. In this embodiment, a hash value (MDC) is made on disk unit, and Layers 0 and 1 are related to each other so that MDC obtained from this relationship is subject to writing of an electronic signature.

Studio Side

At Step C1 of flowchart shown in FIG. 12A, the system is started up. For example, at power-on, CPU 55 of the authoring apparatus shown in FIG. 2 reads the system program data from ROM 53 to RAM 54 to start up the system and controls the entire apparatus. For example, CPU 55 performs the control program to control input/output of each of the data-processing portion 21, the data-adding portion 22, the hash-function-calculating portion 23, the electronic signature block 24, the data-synthesizing portion 26, the monitor 28, and the tape-recording portion 29 on the basis of the operational data D13 obtained from the operation tool 27.

The process of this embodiment goes to Step C2 where a user operates the operation tool 27 to input conditions when video contents Din should be divided into two layers, Layer 0 and Layer 1. In this time, the monitor displays the division conditions into Layer 0 and Layer 1, disk-making information, and the like based on display data D14. The division conditions are instructed by operating the operation tool 27 so that the image data is divided relative to discontinuous portions of image, selector unit (64 or 24 K Bytes) of BD-ROM in the disk-stamper-forming apparatus 15 or the like. So, the user operates the operation tool 27 to add an electronic signature for every part of two items of BD-image data to be divided by the data-processing portion 21. The operational data D13 such as the division conditions and the electronic signature is transmitted to the control device 25.

At Step C3, the data-processing portion 21 receives the video contents Din. At Step C4, the data-processing portion 21 divides the video contents Din into two parts based on the division conditions according to the data-processing signal S11 transmitted from the control device 25. In this case, the video contents Din are divided into two parts according to a standard of UDF 2.5 so that two items of the BD-image data (BD-IMAGE-0.DAT and BD-IMAGE-1.DAT) to BD-ROM can be transmitted. The data-processing signal S11 includes the UK information and CPS information. The above information is described using XML.

The data-processing portion 21 converts a data ES of the video contents Din to a data TS of BD-ROM before or after the division and creates file system finally. In this embodiment, if the video contents have an amount of data of 50 GB, they are divided into two parts, BD-IMAGE-0.DAT file of Layer 0 having an amount of data of 25 GB and BD-IMAGE-1.DAT file of Layer 1 having an amount of data of 25 GB.

The process goes to Step C5 where it is determined whether of MDC of Layer 0 or MDC of Layer 1 is to be formed ahead. If MDC of Layer 0 is to be formed ahead, the process goes to step C6 where BD-image data of Layer 0 becomes BD-IMAGE-0.DAT file that is transmitted to the data-synthesizing portion 26. BD-image data of Layer 1 also becomes BD-IMAGE-1.DAT file that is transmitted to the data-synthesizing portion 26.

The data-processing portion 21 further transmits address data necessary for manufacturing DVD in the disk-stamper-forming facility, disk divisional information, and the like to the data-adding portion 22. The disk divisional information includes PIC information, UK information, and information on an owner (author) of copyright (info).

The process goes to Step C7 where the downloader 50 generates sub-information for disk manufacture based on various kinds of the information obtained from the data-processing portion 21 and the control device 25. The data-adding portion 22 transmits BD-ID-0.DAT file of 4 KB to the hash-function-calculating portion 23 and the data-synthesizing portion 26 based on the data-adding signal S12 transmitted from the control device 25. The data-adding signal S12 includes CPS-Unit information and PIC information. The above information is described using XML. Into BD-ID-0.DAT file, the information on an owner (author) of copyright (info), PIC-DAT(DI) data of 2 KB, and UK-addr data of 16 B are written.

The process then goes to Step C8 where the data-adding portion 22 transmits UCD-0.DAT file of 225 MB to the hashfunction-calculating portion 23 and the data-synthesizing portion 26. These files are not limited in a transmitting order thereof so that they may be transmitted both prior to and subsequent to each other.

The process then goes to Step C9 where the hash-function-calculating portion 23 calculates a message digest code, MDC0. For example, the hash-function-calculating portion 23 calculates hash function of the BD-IMAGE-0.DAT transmitted from the data-processing portion 21 based on the calculation control signal S13 transmitted from the control device 25 to transmit message digest code, MDC01. This MDC01 is obtained by calculating the expression, MDC01=SHA-1(BD-IMAGE-0.DAT) shown as route I in FIG. 10.

Similarly, the hash-function-calculating portion 23 calculates the hash function of UCD-0.DAT to obtain MDC02. MDC02 is obtained by calculating an expression, MDC02=SHA-1(UDC-0.DAT) shown as route II. Further, the hash-function-calculating portion 23 calculates the hash functions of the information on owner (author) of copyright (info), the PIC information, the UK-Addr information, and the MDC01 and MDC02 excluding MDC03 from the BD-ID-0.DAT file to obtain MDC03. MDC03 is obtained by calculating an expression, MDC03=SHA-1(BD-ID-0.DAT without MDC03) shown as route III.

The hash-function-calculating portion 23 further calculates the hash functions of MDC01, MDC02, and MDC03 to obtain MDC0. MDC0 is obtained by calculating an expression, MDC0=SHA-1(MDC01∥MDC02∥MDC03) shown as route IV.

The process then goes to step C14 where it is checked whether another MDC has been calculated. In this embodiment, since MDC1 of Layer 1 has not yet been calculated, the process goes back to Step C5. At Step C5, the process goes to Step C10 where MDC1 of Layer 1 is calculated.

At Step C10, the downloader 50 transmits BD-ID-1.DAT file of 4 KB from the data-adding portion 22 to the hash-function-calculating portion 23 and the data-synthesizing portion 26 based on the data-adding signal S12 transmitted from the control device 25. The process then goes to Step C11 where the downloader 50 transmits UCD-1.DAT file of 225 MB from the data-adding portion 22 to the hash-function-calculating portion 23 and the data-synthesizing portion 26. These files are not limited in a transmitting order thereof so that they may be transmitted both prior to and subsequent to each other.

The process then goes to Step C13 where the hash-function-calculating portion 23 calculates MDC1. For example, The hash-function-calculating portion 23 calculates hash function of the BD-IMAGE-1.DAT transmitted from the data-processing portion 21 based on the calculation control signal S13 transmitted from the control device 25 to transmit MDC11. This MDC11 is obtained by calculating the expression, MDC11=SHA-1(BD-IMAGE-1.DAT) shown as route I in FIG. 11.

Similarly, the hash-function-calculating portion 23 calculates the hash function of UCD-1.DAT to obtain MDC12. MDC12 is obtained by calculating an expression, MDC12=SHA-1(UDC-1.DAT) shown as route II. Further, the hash-function-calculating portion 23 calculates the hash functions of the information on owner (author) of copyright (info), the PIC information, the UK-Addr information, and the MDC01 and MDC02 excluding MDC03 from the BD-ID-1.DAT file to obtain MDC13. MDC13 is obtained by calculating an expression, MDC13=SHA-1(BD-ID-1.DAT without MDC03) shown as route III. The hash-function-calculating portion 23 further calculates the hash functions of MDC11, MDC12, and MDC13 to obtain MDC1. MDC1 is obtained by calculating an expression, MDC1=SHA-1(MDC11∥MDC12∥MDC13) shown as route IV.

The process goes to Step C14 where it is checked whether another MDC has been calculated. Since the MDCs of Layers 0, 1 have been already calculated, the process goes to Step C15 where MDC is obtained using MDC0 and MDC1. For example, the hash-function-calculating portion 23 calculates the expression, MDC=SHA-1(UDC0∥MDC1) shown as route VI to obtain MDC. The hash-function-calculating portion 23 then transmits MDC, MDC0, and MDC1 thus obtained to the electronic signature block 24.

At Step C16, the electronic signature block 24 adds a digital electronic signature based on the electronic signature control signal S14 transmitted from the control device 25, a secret key of owner of contents (copyright) and a public-key, which are obtained from KIC 10, to generate the electronic signature data D2 (=Signature.DAT file). In this time, the electronic signature block 24 obtains MDC1 from the master data D1 of Layer 1 according to Route V shown in FIG. 10 and obtains MDC0 from the master data D0 of Layer 0 according to Route V shown in FIG. 11.

Signature.DAT file has an amount of data having 256 KB and is added for verifying that BD-IMAGE-0.DAT file, UDC-0.DAT file, or BD-ID-0.DAT file of Layer 0 is legitimate and BD-IMAGE-1.DAT file, UDC-1.DAT file, or BD-ID-1.DAT file of Layer 1 is legitimate. To the Signature.DAT file, MDC, MDC0, MDC1, "Signature" indicating the electronic signature, and "Certificate" for certifying an owner of copyright (contents) are written. The electronic signature data D2 is transmitted from electronic signature block 24 back to the data-synthesizing portion 26.

At Step C17, it is determined whether of BD image data of Layer 0 or 1 is to be formed ahead. If BD-image data of Layer 0 is to be formed ahead, the process goes to step C18 where the data-synthesizing portion 26 synthesizes BD-ID-0.DAT file, Signature.DAT file, UCD-0.file, and BD-IMAGE-0.DAT file, which are BD-image data of Layer 0, based on the data-synthesizing signal S15 transmitted from the control device 25 to transmit the master data D0.

The process then goes to Step C19 where the tape-recording portion 29 records BD-ID-0.DAT file in region a31 of the DLT tape 14A', Signature.DAT file in region a32 thereof, UDC-0.DAT file in region a33 thereof, and BD-IMAGE-0.DAT file in region a34 thereof, respectively.

The process then goes to Step C22 where it is determined where the process should finishes. In this embodiment, synthesis processing for BD-image data of Layer 1 and record processing thereof are remained so that the process goes back to Step C17. At Step C17, the process goes to Step C20 where BD-image data of Layer 1 is processed. The data-synthesizing portion 26 synthesizes BD-ID-1.DAT file, Signature.DAT file, UCD-1.file, and BD-IMAGE-1.DAT file, which are BD-image data of Layer 1, to transmit the master data D1. For example, as shown in FIG. 11, the tape-recording portion 29 records BD-ID-1.DAT file in region a41 of the DLT tape 14B', Signature.DAT file in region a42 thereof, UDC-1.DAT file in region a43 thereof, and BD-IMAGE-1.DAT file in region a44 thereof, respectively.

Thus, the master data D0 of Layer 0 composed of four files is recorded on HDD 17 or DLT tape 14A'. In this embodiment, the process goes to Step C21 where the tape-recording portion 29 records the master data D1 of Layer 1 composed of four files on DLT tape 14B'. These DLT tapes 14A', 14B' into which the electronic signature is added are carried or transmitted from the studio to the disk-stamper-forming facility.

The process then goes to Step C22 where power-off information and the like are detected and the process finishes.

Disk-Stamper-Forming Facility Side

Figure 13:
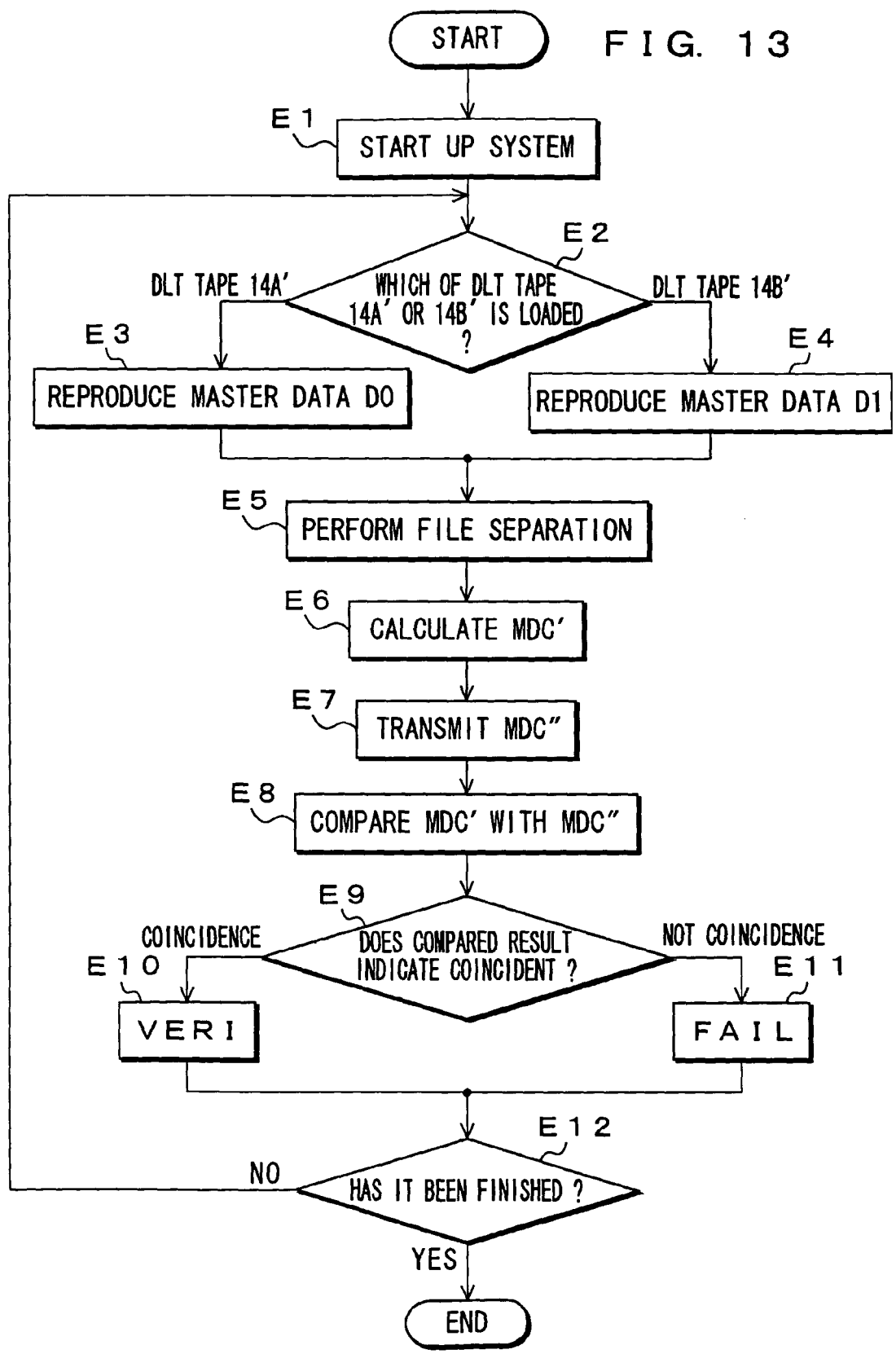
FIG. 13 is a flowchart showing a data-verifying operation example of a second embodiment of the data-verifying apparatus 30 according to the present invention.

FIG. 13 is flowchart for showing a data-verifying operation example of a second embodiment of the data-verifying apparatus 30 according to the present invention.

At Step E1 of flowchart shown in FIG. 13, the system is started up. For example, at power-on, CPU 85 of the data-verifying apparatus 30 shown in FIG. 3 reads the system program data from ROM 83 to RAM 84 to start up the system and controls the entire apparatus. For example, CPU 85 performs the control program to control input/output of each of the data-reproducing portion 31, the data separation portion 32, the MDC calculation portion 33, the memory 34, the MDC' calculation portion 35, the decoder 36, the verification portion 37, the monitor 40 and the like on the basis of the operational data D23 obtained from the operation tool 39.

The process then goes to Step E2 where it is determined whether of DLT tape 14A or 14B is loaded onto the data reproducing portion 31. If DLT tape 14A carried from a studio or the like is loaded onto the data-reproducing portion 31 at Step E2, the process goes to step E3 where data-reproducing portion 31 reproduces the master data D0 based on the data-reproducing signal S21 transmitted from the control device 38. The master data D0 reproduced in the data-reproducing portion 31 is transmitted to the data separation portion 32.

At Step E5, the data separation portion 32 separates from the master data D0 the BD-ID-0.DAT file, Signature.DAT file, UCD-0.DAT file, and BD-IMAGE-0.DAT file, which are included in Layer 0, based on the data separation signal S24. In this time, the Signature.DAT file separated from the master data D0 is stored in the memory 34 based on the data-writing/reading signal S22.

The process goes to Step E6 where the MDC calculation portion 33 obtains real data MDC' by performing the same calculation processing of hash function as that performed in the authoring apparatus 20. For example, the MDC calculation portion 33 receives the BD-ID-0.DAT file, Signature-.DAT file, UCD-0.DAT file, and BD-IMAGE-0.DAT file, which are included in Layer 0, from the data separation portion 32. The MDC calculation portion 33 then, based on the calculation control signal S25, calculates hash function of BD-IMAGE-0.DAT file to obtain MDC01', hash function of UCD-0.DAT file to obtain MDC02', and hash function of BD-ID-0.DAT file to obtain MDC03'.

Referring to FIG. 10, this MDC01' is a value obtained by calculating an expression, MDC01'=SHA-1(BD-IMAGE-0.DAT) shown as route I. MDC02' is a value obtained by calculating an expression, MDC02'=SHA-1(UDC-0.DAT) shown as route II. MDC03' is a value obtained by calculating an expression, MDC03'=SHA-1(BD-ID-0.DAT without MDC03') shown as route III. "BD-ID-0.DAT without MDC03'" means that the information on owner (author) of copyright (info), the PIC information, the UK-Addr information, and the message digest codes MDC01' and MDC02' excluding MDC03' from the BD-ID-0.DAT file are subject to calculation of hash function. The MDC calculation portion 33 obtains real data MDC0' by calculating an expression, MDC0'=SHA-1(MDC01'||MDC02'||MDC03') shown as route IV.

The MDC' calculation portion 35 calculates hash functions of MDC0' obtained from the MDC calculation portion 33 and MDC1' obtained from the memory 34 to transmit MDC' based on the calculation control signal S26. This MDC1' is read out of Signature.DAT file and is a value obtained from the master data D1 of Layer 1 according to route V shown in FIG. 10. MDC' is a value obtained by calculating an expression, MDC'=SHA-1(MDC1'||MDC0'). MDC' is transmitted to the verification portion 37.

At Step E7, the decoder 36 receives Signature.DAT file read out of the memory 34 and decodes SIGN=DSA(MDC) and Certificate of Signature.DAT file based on the decode control signal S23 to transmit message digest code MDC". The MDC" is transmitted to the verification portion 37.

The process goes to Step E8 where the verification portion 37 compares MDC" received from the decoder 36 with MDC' received from the MDC' calculation portion 35 based on the verification control signal S27 to verify whether they are coincident with each other. The process goes to Step E9 where it is determined whether the compared result indicates coincidence.

If the MDC" received from the decoder 36 and the MDC' received from the MDC' calculation portion 35 are coincident, the process goes to Step E10 where the verification portion 37 transmits "VERI0" indicating that the electronic signature of the master D0 of Layer 0 is legitimate. If not, the process goes to Step E11 where the verification portion 37 transmits "FAIL0" indicating that the electronic signature is forged. Thus, the DLT tape 14A' is verified.

The process then goes to step E12 where it is determined whether the process has been finished. In this embodiment, verification of DLT tape 14B' is remained so that the process goes back to Step E2.

At Step E2, if DLT tape 14B' carried from the studio or the like is loaded onto the data-reproducing portion 31, the process goes to step E4 where the master data D1 is reproduced based on the data-reproducing signal S21 transmitted from the control device 38. The master data D1 reproduced in the data-reproducing portion 31 is transmitted to the data separation portion 32.

The data separation portion 32 separates from the master data D1 the BD-ID-1.DAT file, Signature.DAT file, UCD-1.DAT file, and BD-IMAGE-1.DAT file, which are included in Layer 1, based on the data separation signal S24. In this time, the Signature.DAT file separated from the master data D1 is stored in the memory 34 based on the data-writing/reading signal S22.

The process goes to Step E6 where the MDC calculation portion 33 obtains real data MDC' by performing the same calculation processing of hash function as that performed in the authoring apparatus 20. For example, the MDC calculation portion 33 receives the BD-ID-1.DAT file, Signature-.DAT file, UCD-1.DAT file, and BD-IMAGE-1.DAT file, which are included in Layer 1, from the data separation portion 32.

The MDC calculation portion 33 then, based on the calculation control signal S25, calculates hash function of BD-IMAGE-1.DAT file to obtain MDC11', hash function of UCD-1.DAT file to obtain MDC12', and hash function of BD-ID-1.DAT file to obtain MDC13'.

Referring to FIG. 11, this MDC11' is a value obtained by calculating an expression, MDC11'=SHA-1(BD-IMAGE-1.DAT) shown as route I. MDC12' is a value obtained by calculating an expression, MDC12'=SHA-1(UDC-1.DAT) shown as route II. MDC13' is a value obtained by calculating an expression, MDC13'=SHA-1(BD-ID-1.DAT without MDC13') shown as route III. "BD-ID-0.DAT without MDC13'" means that the information on owner (author) of copyright (info), the PIC information, the UK-Addr information, and the message digest codes MDC11' and MDC12' excluding MDC13' from the BD-ID-1.DAT file are subject to calculation of hash function.

The MDC' calculation portion 35 calculates hash functions of MDC1' obtained from the MDC calculation portion 33 and MDC0' obtained from the memory 34 to transmit MDC' based on the calculation control signal S26. Referring to FIG. 11, this MDC0' is a value obtained by calculating an expression, MDC0'=SHA-1(MDC01'||MDC02'||MDC03') shown as route IV. This MDC0' is a value obtained from the master data D0 of Layer 0 according to route V shown in FIG. 11. MDC' is a value obtained by calculating an expression, MDC'=SHA-1(MDC1'||MDC0'). MDC' is transmitted to the verification portion 37.

At Step E7, the decoder 36 receives Signature.DAT file and decodes SIGN=DSA(MDC) and Certificate of Signature- .DAT file based on the decode control signal S23 to transmit message digest code MDC". The MDC" is transmitted to the verification portion 37.

The process goes to Step E8 where the verification portion 37 compares MDC" received from the decoder 36 with MDC' received from the MDC' calculation portion 35 based on the verification control signal S27 to verify whether they are coincident with each other. The process goes to Step E9 where it is determined whether the compared result indicates coincidence.

If the MDC" received from the decoder 36 and the MDC' received from the MDC' calculation portion 35 are coincident, the process goes to Step E10 where the verification portion 37 transmits "VERI1" indicating that the electronic signature is legitimate.

If not, the process goes to Step E11 where the verification portion 37 transmits "FAIL1" indicating that the electronic signature is forged. Thus, the DLT tape 14B is verified. These legitimacy results of electronic signature such as "VERI0", "VERI1" indicating that the electronic signature is legitimate are transmitted to the control device 38, a disk-stamper-forming facility 15, not shown, KIC 10 and the like as the information Rout on a verification result. The process then goes to Step E12 where power-off information and the like are detected to finish the processing.

Thus, according to the second embodiment of the video-contents-protection system 102 according to the present invention, if processing BD-image data of 50 GB, this invention is applied to the authoring apparatus 20 and the data-verifying apparatus 30 so that the authoring apparatus 20 divides the BD-image data into two parts, BD-IMAGE-0.DAT file of 25 GB and BD-IMAGE-1.DAT file of 25 GB, and adds an electronic signature for every part to transmit items of the master data D0, D1 which includes the electronic signature and Signature.DAT file for verifying whether the electronic signature is legitimate.

The data-verifying apparatus 30 determines whether the electronic signature is legitimate based on MDC, MDC0 and/ or MDC1 of Signature.DAT file for every item of the divided master data D0, D1, in connection with DLT tapes 14A, 14B carried from the authoring apparatus 20.

Therefore, similar to the first embodiment, it is possible that a receiving side carries out identification of the transmitting side in connection with the items of the received master data D0, D1 and briefly and easily identifies or verifies that the items of the master data D0, D1 are not forged or manipulated for each of the items of the divided master data D0, D1.

Further, in addition to excellent effects of the first embodiment of the video-contents-protection system 101, in the video-contents-protection system 102, MDC0 of Layer 0 and MDC1 of Layer 1 are written into Signature.DAT file that is used in common with layers 0, 1. Thus, the electronic signature is made one so that it is possible to easily manage the copyrighted works in KIC 10.

It is to be noted that FIGS. 14A and 14B are diagrams each for illustrating a recorded format of non-divisional BD-image data scheme as comparison examples.

BD-image data has been divided into two layers, Layer 0 and Layer 1, in the above first and second embodiments of the invention while, according to the recorded format shown in FIG. 14A, a message digest code (MDC) is prepared in the entire BD-image data, not divided. In this embodiment, BD-ID.DAT file of 4 KB, which includes information on owner (author) of copyright (info), PIC information, and UK-Addr information, is written into the region a51. Signature.DAT file of 256 KB, which includes "Certificate", "Signature", and MDC, is written into the region a52. UCD.DAT file of 450 MB is written into the region a53. BD-IMAGE.DAT file of 50 GB is written into the region a54.

MDC included in Signature.DAT file is a value obtained by calculating an expression, MDC=SHA-1(BD-IMAGE.DAT||UCD.DAT||BD-ID.DAT). Such the scheme allows copyrighted works to be easily managed because one electronic signature is used.

This scheme, however, divides no BD-image data into two layers, Layers 0 and 1, as the above first and second embodiments of the invention, so that it takes a long time to prepare MDC. According to the scheme, it is necessary to take a long time to modify the data.

Further, as described above, BD-image data has been divided into two layers, Layer 0 and Layer 1, in the above first and second embodiments of the invention while, according to the recorded format shown in FIG. 14B, MDC is previously calculated for each file and then an MDC is prepared in the entire BD-image data. In this embodiment, BD-ID.DAT file of 4 KB, which includes information on owner (author) of copyright (info), PIC information, UK-Addr information, MDC1, MDC2, and MDC3, is written into the region a51. Signature.DAT file of 256 KB, which includes "Certificate", "Signature", and MDC, is written into the region a52. UCD- .DAT file of 450 MB is written into the region a53. BD-IMAGE.DAT file of 50 GB is written into the region a54.

MDC included in Signature.DAT file is obtained as follows: MDC1 is first obtained by calculating an expression, MDC1=SHA-1(BD-IMAGE.DAT) shown as route I; MDC2 is obtained by calculating an expression, MDC2=SHA-1 (UDC-1.DAT) shown as route II; MDC13 is obtained by calculating an expression, MDC3=SHA-1(BD-ID-1.DAT without MDC3) shown as route III; and MDC is obtained by calculating an expression, MDC=SHA-1 (MDC1||MDC2||MDC3) shown as route IV. A value of the obtained MDC is written into Signature.DAT file. According to this scheme, it also takes a long time to prepare MDC because this scheme divides no BD-image data into two layers as the above first and second embodiments of the invention.

Thus, according to the above embodiments in BD-image data division scheme of the invention, contents of BD-image data of 50 GB are divided into some parts, items of the divided master data D0, D1, and the like are respectively subject to writing of the electronic signature, and if the message digest code is prepared, its message digest codes (MDC01, MDC02, and MDC03; MDC11, MDC12, and MDC13; and the like) are previously calculated so that they are written into BD-ID.DAT file, for example of the above embodiment.

If the disk-manufacturing information or the like alters thereafter, it may become unnecessary to prepare the message digest code again from all the data. If data excluding BD-image data alters, according to the above embodiments in BD-image data division scheme of the invention, it takes about one 100th time to re-calculate the message digest codes as comparing the non-divisional BD-image data scheme as comparison examples shown in FIGS. 14A and 14B. This is because calculation time therefor is proportional to an amount of data of them (50 GB:0.5 GB=100:1).

The present invention could well be applied to a system in which electronic information on copyrighted work such as a large amount of image data for a disk is transmitted from a transmitting side, studio or the like, to a receiving side, a disk-stamper-forming facility or the like.

Thus have been described the information-processing system and method, and the information transmission-processing apparatus, and the information-reception-processing apparatus. It should be understood by those skilled in the art that various modifications, combinations, sub-combinations and alternations may occur depending on design requirements and other factors insofar as they are within the scope of the appended claims or the equivalents thereof.

What is claimed is:

1. An information-transmission-processing apparatus for transmitting electronic information corresponding to a copyrighted work, said information having a predetermined amount of data, with an electronic signature being added thereto, said apparatus comprising:
   a division-processing unit configured to divide the electronic information corresponding to the copyrighted work into at least two parts;
   an electronic-signature-operating unit configured to add the electronic signature to each part of the electronic information corresponding to the copyrighted work divided by the division-processing unit; and
   an information-transmitting unit configured to combine the electronic information corresponding to the copyrighted work to which the electronic-signature-operating unit has added the electronic signature, to combine electronic signature information for determining whether the electronic signature is legitimate and to transmit the combined information.

2. The information-transmission-processing apparatus according to claim 1,
   wherein the electronic-signature-operating unit is further configured to:
   calculate message digest information using hash function for each part of the divided electronic information corresponding to the copyrighted work, and
   encrypt the message digest information calculated based on public-key information and secret key information.

3. The information-transmission-processing apparatus according to claim 2,
   wherein the electronic-signature-operating unit is further configured to:
   calculate the message digest information using the hash function in connection with additional information that is added to each part of the divided electronic information corresponding to a copyrighted work, and
   encrypt the message digest information in connection with the additional information, said message digest information being calculated based on the public-key information and the secret key information.

4. An information-transmission-processing apparatus which transmits electronic information corresponding to a copyrighted work, said information having a predetermined amount of data, with an electronic signature being added thereto, said apparatus comprising:
   division-processing device which divides the electronic information corresponding to the copyrighted work into at least two parts;
   electronic-signature-operating device which adds the electronic signature to each part of the electronic information corresponding to the copyrighted work divided by the division-processing device; and
   information-transmitting unit which combines the electronic information corresponding to the copyrighted work to which the electronic-signature-operating device adds the electronic signature and electronic signature information for determining whether the electronic signature is legitimate and transmits the combined information.

5. An information-reception-processing apparatus for receiving and verifying electronic information corresponding to a copyrighted work, said information having a predetermined amount of data, with an electronic signature being added thereto, said apparatus comprising:
   a receiving unit configured to receive the electronic information corresponding to the copyrighted work, said information being divided into at least two parts and including the electronic signature, and electronic signature information for determining whether the electronic information corresponding to the copyrighted work is legitimate; and
   a determining unit configured to determine whether the electronic signature is legitimate based on the electronic signature information for each part of the previously divided electronic information corresponding to the copyrighted work, in connection with the electronic information corresponding to the copyrighted work thus received by the receiving unit.

6. The information-reception-processing apparatus according to claim 5, further comprising a decoder which decodes the electronic signature information based on public-key information and secret key information.

7. An information-reception-processing apparatus which receives and verifies electronic information corresponding to a copyrighted work, said information having a predetermined amount of data, with an electronic signature being added thereto, said apparatus comprising:
   receiving device which receives the electronic information corresponding to the copyrighted work, said information being divided into at least two parts and including the electronic signature, and electronic signature information for determining whether the electronic information corresponding to the copyrighted work is legitimate; and
   determining device which determines whether the electronic signature is legitimate based on the electronic signature information for each part of the previously divided electronic information corresponding to the copyrighted work, in connection with the electronic information corresponding to the copyrighted work thus received by the receiving device.

8. An information-processing system which processes electronic information corresponding to a copyrighted work, said information having a predetermined amount of data, with an electronic signature being added thereto, the system comprising:
   information-transmission-processing apparatus which transmits the electronic information corresponding to the copyrighted work by dividing the electronic information corresponding to the copyrighted work into at least two parts, adding the electronic signature to every part of the divided electronic information corresponding to the copyrighted work, and combining the electronic information corresponding to the copyrighted work including the electronic signature and electronic signature information for determining whether the electronic signature is legitimate and transmitting the combined information; and information-reception-processing apparatus which receives the electronic information corresponding to the copyrighted work from the information-transmission-processing apparatus, wherein it is determined whether the electronic signature is legitimate based on the electronic signature information for each part of the divided electronic information corresponding to the copyrighted work in connection with the received electronic information corresponding to the copyrighted work.

9. The information-processing system according to claim 8, wherein the information-transmission-processing apparatus performs:

generation of message digest information using hash function for each part of the divided electronic information on copyrighted work, and encryption of the generated message digest information based on public-key information and secret key information.

10. The information-processing system according to claim 8, wherein the information-reception-processing apparatus decrypts the electronic signature information based on public-key information and secret key information, which are received from the information-transmission-processing apparatus.

11. An information-processing method for processing electronic information corresponding to a copyrighted work, said information having a predetermined amount of data, with an electronic signature being added thereto, the method comprising:

dividing the electronic information corresponding to the copyrighted work into at least two parts at a transmitting side;

adding the electronic signature to every part of the divided electronic information corresponding to the copyrighted work at the transmitting side;

combining the electronic information corresponding to the copyrighted work including the electronic signature and electronic signature information for determining whether the electronic signature is legitimate and transmitting the combined information to a receiving side;

receiving, at the receiving side, the electronic information corresponding to the copyrighted work and the electronic signature information from the transmitting side; and determining whether the electronic signature is legitimate based on the electronic signature information for each part of the divided electronic information corresponding to the copyrighted work, in connection with the electronic information corresponding to the copyrighted work that has been received from the transmitting side.

12. The information-processing method according to claim 11, wherein when adding a message digest information to each part of the divided electronic information on copyrighted work, plural pieces of the message digest information are subject to writing of an electronic signature.

13. The information-processing method according to claim 11, wherein a common message digest information is generated based on the message digest information that is added to a part of the divided electronic information corresponding to the copyrighted work and the message digest information that is added to each other part of the divided electronic information on copyrighted work; and wherein the common message digest information is encrypted to generate common electronic signature information.

14. The information-processing method according to claim 13, wherein the common message digest information thus encrypted is added to at least two parts of the divided electronic information on copyrighted work.

15. The information-processing method according to claim 11, further comprising:

calculating message digest information using hash function for each part of the divided electronic information corresponding to the copyrighted work and encrypting the calculated message digest information based on public-key information and secret key information.

16. The information-processing method according to claim 11, further comprising:

calculating message digest information using hash function in connection with additional information added to each part of the divided electronic information corresponding to the copyrighted work and encrypting the calculated message digest information in connection with the additional information based on public-key information and secret key information.

17. The information-processing method according to claim 11, wherein the receiving side decrypts the electronic signature information using public-key information and secret key information that have been received from the transmitting side.

18. An information-transmitting method for transmitting electronic information corresponding to a copyrighted work, said information having a predetermined amount of data, with an electronic signature being added thereto, the method comprising:

dividing the electronic information corresponding to the copyrighted work into at least two parts;

adding the electronic signature to each part of the divided electronic information corresponding to the copyrighted work; and combining the electronic information corresponding to the copyrighted work including the electronic signature and electronic signature information for determining whether the electronic signature is legitimate and transmitting the combined information.

19. An information-receiving method for receiving and verifying electronic information corresponding to a copyrighted work, said information having a predetermined amount of data, with an electronic signature being added thereto, said method comprising:

receiving the electronic information corresponding to the copyrighted work, said information being divided into at least two parts and including the electronic signature, and electronic signature information for determining whether the electronic signature is legitimate; and determining whether the electronic signature is legitimate based on the electronic signature information for each part of the previously divided electronic information corresponding to the copyrighted work, in connection with the received electronic information corresponding to the copyrighted work.

20. A computer-readable storage medium having stored therein a program for performing an information-transmitting method for transmitting electronic information corresponding to a copyrighted work, said information having a predetermined amount of data, with an electronic signature being added thereto, the method comprising:

dividing the electronic information corresponding to the copyrighted work into at least two parts;

adding the electronic signature to each part of the divided electronic information corresponding to the copyrighted work; and combining the electronic information corresponding to the copyrighted work including the electronic signature and electronic signature information for determining whether the electronic signature is legitimate and transmitting the combined information.

21. A computer-readable storage medium having stored therein a program for performing an information-receiving method for receiving and verifying electronic information corresponding to a copyrighted work, said information having a predetermined amount of data, with an electronic signature being added thereto, said method comprising:

receiving the electronic information corresponding to the copyrighted work, said information being divided into at least two parts and including the electronic signature, and electronic signature information for determining whether the electronic signature is legitimate; and determining whether the electronic signature is legitimate based on the electronic signature information for each part of the previously divided electronic information corresponding to the copyrighted work, in connection with the received electronic information corresponding to the copyrighted work.

22. The information-transmission-processing apparatus according to claim 1, further comprising:

a recordable medium data transmitting unit configured to address information and disk division information necessary to record the electronic information divided by the division-processing unit on a recordable storage medium.

* * * * *